(12) United States Patent
Chessa et al.

(10) Patent No.: US 10,238,578 B2
(45) Date of Patent: Mar. 26, 2019

(54) APPARATUS AND METHODS FOR A SEMI-AUTOMATIC PILL COUNTING TRAY

(71) Applicant: Countrue, LLC, Walnut Creek, CA (US)

(72) Inventors: Barbara Lyn Chessa, El Paso, TX (US); Arash Abdollahi Sabet, Walnut Creek, CA (US); Douglas Arthur Pinnow, Lake Elsinore, CA (US)

(73) Assignee: CounTrue, LLC, El Paso, TX (US)

( * ) Notice: Subject to any disclaimer, the term of this patent is extended or adjusted under 35 U.S.C. 154(b) by 181 days.

(21) Appl. No.: 15/348,887

(22) Filed: Nov. 10, 2016

(65) Prior Publication Data

US 2018/0125760 A1    May 10, 2018

(51) Int. Cl.
*G01G 19/00* (2006.01)
*G01G 19/42* (2006.01)
*A61J 7/02* (2006.01)

(52) U.S. Cl.
CPC .............. *A61J 7/02* (2013.01); *G01G 19/00* (2013.01); *G01G 19/42* (2013.01); *A61J 2200/74* (2013.01)

(58) Field of Classification Search
CPC ........ A61J 7/02; A61J 7/0069; A61J 2205/50; A61J 2200/74; G01G 19/42
USPC .......................................................... 177/1
See application file for complete search history.

(56) References Cited

U.S. PATENT DOCUMENTS

| 4,013,192 | A | * | 3/1977 | Pillon | B65G 47/1428 221/186 |
| 4,401,176 | A | * | 8/1983 | Knothe | G01G 21/23 177/180 |
| 5,623,128 | A | * | 4/1997 | Grimm | G01G 3/1406 177/211 |
| 8,770,400 | B2 | * | 7/2014 | Connellan | A61J 7/02 206/223 |
| 9,241,877 | B2 | * | 1/2016 | Burton | A61J 7/02 |
| 2004/0118753 | A1 | * | 6/2004 | Belway | A61J 7/02 209/551 |
| 2013/0204432 | A1 | * | 8/2013 | Panetta | G06M 7/00 700/231 |
| 2014/0263389 | A1 | * | 9/2014 | Perozek | A61J 7/02 221/1 |
| 2014/0310018 | A1 | * | 10/2014 | Cizmarik | G06F 19/3462 705/2 |

* cited by examiner

*Primary Examiner* — J M Saint Surin
(74) *Attorney, Agent, or Firm* — Douglas A. Pinnow

(57) ABSTRACT

This invention relates to modifications to the traditional manually operated pill counting tray that is broadly used throughout the world to provide features that permit semi-automatic operation that is faster and more accurate than manual-only operation when counting pharmaceutical pills. The tray modifications are based on electronic weight-based sensing technology including the addition of (1) a weighing load sensor to determine the weight of the pills to be counted, (2) a motion sensor and latch for the trough lid to aid operation and performance, (3) a microprocessor that can convert the measured weight of the pills to a pill count, and (4) an output display to show the number of pills counted. This apparatus includes novel features to improve pill counting speed and accuracy, as well as ease of use, that are only possible when employing electronic counting.

25 Claims, 16 Drawing Sheets

APPARATUS AND METHODS FOR A SEMI-AUTOMATIC PILL COUNTING TRAY

CROSS REFERENCES TO RELATED APPLICATIONS

This application claims the benefits of U.S. Provisional Patent Application Ser. No. 61/798,442 filed Mar. 15, 2013, titled METHODS AND DEVICES FOR DISCRETE OBJECT COUNTING and U.S. Non-Provisional patent application Ser. No. 14/214,692 filed Mar. 15, 2014 and titled APPARATUS AND METHODS FOR A SEMI-AUTOMATIC PILL COUNTING TRAY, the contents of which are hereby incorporated by reference herein.

TECHNICAL FIELD AND INDUSTRIAL APPLICABILITY OF THE INVENTION

This invention relates to modifications to the traditional manually operated pill counting tray that is broadly used throughout the world to provide additional features that permit semi-automatic operation that is faster and more accurate than manual operation when counting pharmaceutical pills.

BACKGROUND OF INVENTION

Approximately 60,000 drug stores in the United States and 350,000 worldwide dispense prescription medications to patients each day. At the point of sale, tablets and capsules are stored in larger bulk quantities, and are then counted, packaged into smaller containers, labeled for use, and distributed to customers.

The classical tool for counting pills is the manual pill counting tray, and its use requires hand dexterity and the concentration of the user. To use, the user first deposits an unknown quantity of pills from a bulk-stock container onto the counting surface (platform) of a pill counting tray. Then, a spatula is used to move pills in uniformly sized groups of typically five pills each from this surface into an adjoining depressed trough region. Pills moved in this way are destined for dispensation; therefore the user is required to remember the changing count of pills reaching the trough throughout the counting process. Once the quantity of pills in the trough reaches the desired prescription quantity, the user closes a lid that blocks further pills from being deposited into the trough. By tilting the counting tray, the user returns excess pills from the platform surface back into the bulk-stock container. By tilting the tray in a different direction, counted pills are released through a funnel-shaped region in the trough into a prescription package, vial, bottle or the like. Throughout the day, this process may be repeated several hundred times at any one pharmacy. A testament to the manual counting tray's utility is that it has widely been used throughout the world for decades and is still used extensively by pharmacists today.

The manual pill counting tray's virtues include its straightforward operation, compact size, low cost, universal applicability to pills of varying shapes and sizes, easy cleanability, durability, and reputation as a time-honored standard for pill dispensation. In addition, as pills may be damaged, it offers an opportunity for the users to visually assess the pills as they are counted.

Nevertheless, the manual pill counting tray has drawbacks that include accuracy limited to the capability of the human user and concomitant limitations in speed of use. Reliance on human vision and memory as a means of counting is inherently error-prone, resulting in counting error at a rate of approximately 1 in 24 pills in the retail pharmacy setting. This inaccuracy can further be explained by distractions, such as telephone calls or customer interactions that may disrupt the concentration of the user while counting. The process is itself fatiguing, thus increasing the likelihood of user errors.

Though electronic and technologically sophisticated systems for dispensing pills are becoming increasingly more common, costs associated with these systems typically restrict their use to a limited subset of high-volume therapeutics. Examples of these systems include the Rx-4 pill counter sold by Rx Count Corporation (17945 Sky Park Circle, Ste. B; Irvine, Calif. 92614) and the KL1 automated pill counter produced by Kirby Lester, LLC (13700 Irma Lee Court, Lake Forest, Ill. 60045). Both of these systems employ optical scanning to count a stream of pills that pass through them. The pills to be counted by Rx-4 are poured onto a motor driven horizontally orientated table that rotates. The mechanics of this system limit the movement to one pill at a time past an optical scanner. In contrast, the KL1 is known as a "pour through" counting system. It has a small hopper at the top into which the pills to be counted are poured (see U.S. Pat. No. 6,497,339). By using a sprinkling technique to transfer pills from typically a bulk-storage container into the hopper, a limited stream of pills falls through a small opening at the bottom of the hopper and proceeds past a sophisticated optical scanner that can detect and count both single pills and small groups of pills, as described in U.S. Pat. No. 5,768,327. These systems, which cost in the range of several thousand dollars each, are not optimally suited to the highly variable requirements of individually dispensed medications in the retail environment where inventory levels and costs must be controlled. They also require a substantially higher level of operator training for use and maintenance.

One particular aspect of maintenance is that of cleaning the surfaces of the pill counting devices to avoid cross-contamination of residues that may be left after counting of one type of pill before counting another type having different chemistry. Such cleaning is necessary to avoid possible harm to patients using the counted pills. Clearly, cleaning the open platform and trough surfaces of a manual pill counting tray is less complicated than cleaning a rotating table and associated moving mechanical parts or cleaning the inside of a hopper, internal optics, and multifaceted receptacle container.

In addition to expensive counting systems such as the ones described above, there have been two prior attempts to semi-automate the traditional pill counting tray. Neither has yet experienced commercial success. The first is an optical based counting system described in U.S. Pat. No. 6,574,580 PHARMACY PILL COUNTING VISION SYSTEM, that will be referred to as Hamilton '580, and the second is a weight-based counting system described in U.S. Pat. No. 8,530,763 COUNTING SCALE AND METHOD OF COUNTING INVOLVING DETERMINATION OF SUB-MULTIPLES BY MEANS OF A SERIES OF DIVISORS, referred to as Bradley '763.

While Hamilton '580 employs a somewhat conventional manual pill counting tray to place the pills being counted, it also requires an overhead digital camera having a field of view focused on the tray and a personal computer (PC) to process the camera's output signal and to display the count results. In addition, a special light source is normally used that can vary in color to improve the visual contrast of various colored pills placed in the tray. While the tray remains compact in size and low in cost, the entire optical based system is quite complex, considerably larger than only the tray, and non-trivial to keep in alignment. It is not surprising that this optical-based system may not be commercially competitive with the more established automatic systems like the ones previously described.

In contrast, the weight-based semi-automated tray counting system in Bradley '763 has the desirable features of being compact and presumably low in cost to manufacture. However, the tray modifications introduced by Bradley '763 do not support the design objective or capability of improving pill counting speed. Rather, the objective behind this invention is limited to enhancing pill counting accuracy. As stated in Bradley '763 "The device [pill counting tray] may have a display that can be made obscure in that the displayed, derived values [of pills counted] can be hidden from view to prevent its use as a primary count checker. For, example, a disclosed system places the display on the underside of a tray table where the results cannot be observed initially. Such an arrangement can be advantageous in the case of weighing pills, in that increased reliability will be obtained by forcing the pharmacy personnel to count the pills [manually] first and use the results of the automated weigh count process as ancillary." This patent goes on to say "Since the device/method typically will be used for a cross check only, the need for an elaborate weighing device is eliminated. The same inexpensive plastic counting tray that is used today can be used, with the addition of a relatively inexpensive weighing capability."

The inventive aspect of Bradley '763 is limited to a novel weight based electronic counting method that proceeds in parallel while the user is conducting a normal manual pill count. Specifically, as groups of pills are manually counted and transferred from the tray to the trough by the user, the weight of each group is also determined and then electronically processed. The inventive aspect of Bradley '763 is a novel method for determining the unit weight of the pills being transferred so that count of the total number of pills in the trough can be computed by dividing the total weight of all of the pills transferred to the trough by their unit weight without any user involvement.

According to Bradley '763 "The processing device is operable to programmatically apply a series of divisors to consecutive values of the [transferred group of pills'] weight signal in order to automatically discern submultiples in the consecutive values . . . . This produces a series of prospective unit weights for the first weighing, a series of prospective weights for the second weighing, third weighing, and so forth. Each of the series is searched to find unit values that substantially match, thereby producing at least one collection of count values, one count for each of the weightings."

The reality of this rather complex calculation to determine the pill count is that it simply will not work if the user counts groups of, say, five pills at a time (which is typical for many manual users) because the processor will not be able to distinguish whether a single heavy pill or five lighter weight pills are being transferred from the platform to the trough. To obtain a satisfactory result using the methods taught by Bradley '763, the operator must be trained to transfer groups of pills having different total numbers so that the prospective weights for each group can be compared and, hopefully, identify a unique weight that is common to all of the groups. In the example discussed above, where the groups always consist of five pills, a unique weight will not be established for individual pills. Rather the pill weight will be either that of one pill or five pills. However if different numbers of pills are transferred in successive groups, such as 7, 12, and 11 pills, there would be a single prospective unit weight that would satisfy all three groups. This value would then be selected for the unit weight associated with all 30 pills (7+12+11) that were transferred.

It should be noted that in FIGS. 1, 4, and 5 of Bradley '763 the circuit board (116) where the microprocessor device is mounted is located directly under the flat platform area of the counting tray. The weighing device in Bradley '763 is typically located directly under this same flat platform so that in use the weight of any pills that are swept from the platform into the trough by the user (the normal operation of a manual counting tray) can be inferred by the reduction in the total weight of the pills on the platform. However, Bradley '763 also mentions that the weight sensor can also connect to the trough or two weight sensors may be employed, one for the platform and the other for the trough, to provide redundant determination of the weight. Yet in another embodiment, Bradley '763 mentions that four weight sensors can be used with one located in each of the four legs that support the tray's platform. In this case, the weight of the pills on the platform would be equal to the sum of the outputs from all four weight sensors. For satisfactory operation, there can be no mechanical connection between the platform and the trough. Otherwise, there would be no detected weight change when pills are moved from the platform to the trough.

Bradley '763 also calls for a tilt sensor switch in all embodiments of this invention. This switch closes when the tray is set upon a counter or other horizontal surface. The closure is sensed by the microcontroller which then automatically initiates the electronic weighing sequence that automatically proceeds in parallel with manual counting by the user.

It is apparent from both the description and design of the device(s) in Bradley '763 that the objective is to improve pill counting accuracy and that no consideration has been given to improving pill counting speed. It would, of course, be desirable to simultaneously improve both pill counting accuracy and pill counting speed if that were possible because greater speed would save time for the user and that savings could be translated into a financial benefit. However, there has been no prior effort to add an inexpensive weight-based counting capability to semi-automate a pill counting tray to improve both counting accuracy and pill counting speed. In fact, it is not obvious that both of these goals can be simultaneously achieved due to a number of uncertain factors including: (1) Sufficient weight variation from pill to pill such that there may be no way to ensure an accurate count. This variation could be caused by abrasions of pills, less that 100% homogeneity of the pill's material, moisture pick-up by the pills from variable ambient humidity, and dust from pills that may be inadvertently transferred from the counting platform to the trough in uncontrolled amounts when the user transfers a group of pills. (2) The possibility of overfilling the trough so that large pill counts (say 90 or more) would require more than a single counting sequence and thereby slow down the counting speed to the point where the entire semi-automatic counting process becomes less efficient. (3) The difficulty of making the weighing device sufficiently linear in response and insensitive to ambient air currents and pressure waves and stray electrostatic fiends so that weight of both small and large numbers of pills can be accurately determined without elaborate or complex scale designs that would make the manufacturing cost excessive. (4) The possibility that higher speed pill counting could only be achieved with operating procedures that would be difficult for typical users to learn. (5) A pill counting tray that would be awkward for a user to lift to pour counted pills into a prescription container and uncounted back into a bulk-storage container. (6) The lack of prior art that might provide some guidance on feasibility and methods for improving pill counting speed with a semi-automated pill counting tray.

When considering all of these factors, one is left with uncertainty and related risk of failure for anyone desiring to improve both pill counting accuracy and speed by attempting to semi-automate a manual pill counting tray. Nevertheless, it is expected that a success in this area would be broadly welcomed by pharmacists throughout the world.

See also U.S. Pat. Nos. 4,512,428; 4,738,324; 4,646,767; 4,802,541; 4,856,603; 5,473,703; 6,738,723; 7,633,018; 8,271,128; 8.464,765; and U.S. Pub No. 2008/0011764.

SUMMARY OF THE INVENTION

The present invention describes a semi-automated pill counting tray having a design and method of operation that addresses all of the above concerns and other problems that only became apparent after undertaking a serious product development. Specifically, the inventive counting tray has a size and appearance quite similar to a conventional manual pill counting tray and it can, in fact, be used in either a manual or semi-automatic counting mode—with the semi-automatic mode generally preferred due to the higher count accuracy and improved counting speed. The primary differences in outer appearance, other than styling features, are that the semi-automatic counting tray includes the addition of a user activated switch and a small display on its top surface for showing the total number of pills in the trough at any point during a pill counting sequence. In addition, the volume of the trough is approximately twice as large as a typical trough for manual-only pill counting trays, in the range of 200 to 400 cubic centimeters with a nominal value of 300 cubic centimeters, so that larger numbers of pills can be counted in a single counting sequence before the trough is filled and thereby improve counting speed by eliminating a two-step pill counting sequence or a multi-step counting sequence greater than two-step. In effect, the larger trough size is important to take full advantage of the potential counting speed that is possible with semi-automation. Yet, the advantage of using a larger trough was not recognized in Bradley '763, nor in any other prior art. One may presume that this exception in Bradley '763 is related to a disregard for improving counting speed.

The semi-automated counting tray employs a commercially available single point weight load cell located directly under the trough and secured to it to measure the weight of pills added to the trough. The measured change in weight can be translated into a change in the number of pills in the trough as discussed in detail, below. In some cases this weight load cell has an associated analog-to-digital converter to condition the cell's electrical output to make up the entire weighing load sensor.

The electrical output signal from the weighing load sensor is transmitted over conducting wires to a microprocessor device (that could include a programmable gate array or the like) that is mounted on a printed circuit board. If the weighing load sensor signal has not already been digitized, it must pass through an analog-to-digital converter before arriving at the microprocessor device. The microprocessor device also connects to a display, visible to the user, and to a single rechargeable battery (typically, a 3.7 Volt lithium ion battery) that serves as the power source for the entire semi-automatic pill counting tray. Significantly, the printed circuit board, battery and weighing load sensor are all located near to the trough rather than under the flat platform, as described in Bradley '763, to improve the handling characteristics of the tray. Specifically, it was observed during product development that when the counting tray is manually lifted to pour counted pills out of the trough into a prescription container or to pour uncounted pills back into a bulk-storage container, the user typically lifts the counting tray by grasping the trough. It was found that locating the load cell, printed circuit board and battery closer to the trough has the beneficial effect of moving the center of gravity of the tray closer to the user's hand during lifting and that reduces undesired torque and strain on the hand. This will be discussed further in the DETAILED DESCRIPTION OF THE DRAWINGS. The advantage in locating the load cell, printed circuit board and battery near to the trough to improve handling characteristics was not recognized in Bradley '763 nor in any other prior art.

The present semi-automated pill counting tray includes a small linear slot between the platform of the tray and the trough that is sufficiently wide to pass pill dust and small chips from pills but not wide enough to pass entire pills. The purpose of this slot is to (1) permit pill dust and chips from pills to fall through the slot to the surface below the tray so that these loose materials will not hinder the operation of the weighing load sensor (2) facilitate cleaning of the tray and (3) minimize the effect of pill dust and chips on the detected weight of pills transferred to the trough. This slot feature is important to maintaining the counting accuracy of the semi-automated tray and was not recognized in Bradley '763 nor in any other prior art.

Although it was not obvious at the start of the development that a satisfactory semi-automated pill counting tray could be made using a commercially available weighing load sensor that is inexpensive due a possible lack of linearity in the performance of such a load sensor (i.e. measured output weight is not precisely proportional to actual weight over the full weight range of the load sensor), it has been determined that any non-linearity can be dealt with by calibrating the weight load sensor when the semi-automated pill tray is manufactured. The results of the calibration can then stored in a program within the microprocessor as a table or an equation to provide to best fit to true weight over the entire range used during normal operation of the counting tray.

During early development of the semi-automated pill counting tray, counting would be done with the lid fully open, which is similar to how a traditional manual counting tray is used. Because the trough was directly exposed to ambient air, the weigh sensor could detect slight pressure variations caused by air disturbances. Typical sources of such air disturbances include the operation of HVAC systems, electric fans, the nearby motion of people or equipment, or even the rapid motion of the spatula as it sweeps pills into the trough. Detecting such pressure variations and forwarding them to the microprocessor, the microprocessor might then erroneously interpret them as the addition or subtraction of one or two pills to or from the trough. Two features of the semi-automatic pill counting tray work in concert to mitigate the effect of air currents upon counting operations. They include special programming of the microprocessor to process, analyze and average out over time such pressure readings, and a unique product structure that fixes the lid in a partially open position to effectively cover and shield the trough to form a cocoon-like structure while still allowing for the passage of pills into the trough.

Special programming of the microprocessor has been determined to be helpful in mitigating the effects of air disturbances. In the case of a fan, the pulsatile surges in air pressure caused by the rotating fan blades produce a periodic variation of air pressure on the trough, which affects the apparent weight. Since this effect is both periodic and predictable, the microprocessor can be programmed to detect the magnitude and periodicity of the pressure surges and thereby eliminate them, for example, by signal averaging. To accomplish this, the microprocessor may be operated at a higher speed so that multiple weight measurements can be performed during a single air pulse period. However, in most cases this will not be necessary because the microprocessor typically updates the weight signal 80 times per second—which is fast enough to deal with most pulsating sources.

In the case of dealing with sources of air turbulence not necessarily associated with a fan, the microprocessor can be programmed to monitor and identify any random or unusual electrical signal originating from the weigh sensor. If any such changes are observed, the weight signal can be automatically averaged over a longer time interval (i.e. a longer time constant) to eliminate or substantially reduce such effects. The mitigation of air disturbance effects on the weighing process with special purpose microprocessor instructions was not recognized in Bradley '763 nor in any related prior art.

While effective at preserving accuracy, the longer processing time associated with the special programming feature would sometimes effect a pause or a "wait time" to the counting operation that would ultimately slow counting speed. For this reason, the aforementioned design of a partially opened and fixed lid over the trough forming a cocoon-like structure was implemented and determined to effectively maintain speed without compromising accuracy with the presence of significant ambient air disturbances. To hold the lid fixed, a lid latch engages and fixes the lid when the user rotates the lid clockwise or counterclockwise from the open or closed positions respectively. When the lid is held fixed by the lid latch, the relative position of the lid with respect to the top surface of the platform forms an opening or passageway for the pills to be transferred from the platform into the trough. While the minimum height of the passageway is 10 mm in order to allow for the passage of the largest sized pills, a nominal height of 30 mm is employed. Through experimentation, it was discovered that this particular shielding configuration effected a reduce air pressure on the load cell from an overhead fan by greater than 50%, without diminishing usability.

Another non-obvious problem that could lead to an incorrect pill count was identified and eliminated during the development of the semi-automated scale. This problem relates to the possibility that as an increasing number of pills are added to the trough, it is possible that the buildup of layers of pills in the trough could cause one or more pills in the upper layer(s) to bridge the gap between the trough and the platform. Additionally, a pill could similarly bridge this gap if it is pushed by a spatula across the platform towards the trough, but then stops short, at the gap. If this were to happen, only a fraction of the weight of the bridging pill(s) would be properly weighed by the load cell under the trough. It was determined by experimentation that such bridging could be eliminated by careful design of the interface between the trough and the platform, as will be discussed in the DETAILED DESCRIPTION OF THE DRAWINGS. This problem was neither identified nor resolved in Bradley '763 nor in any other prior art.

When using the semi-automatic pill counting tray to count and dispense a typical prescription, the user begins with an empty platform, empty trough, and closed lid. The user then pours an approximate amount of pills to be counted from a bulk-storage container onto the platform. Following this, the user opens the lid so that rib 70 of the lid (refer to FIG. 3A), located at the curved edge of the lid nearest the display, moves past the lid latch, and slightly towards its position when fully open. The user then releases the lid, causing it to fall in a clockwise motion so that the rib 70 snugs up against the tapered geometry of the lid latch, securing the lid in a fixed position. This arrangement effectively creates a passageway between the lid and platform that is nominally 30 mm in height, however alternate embodiments of the invention could have a passageway as small as 10 mm in height. Engaging the lid with the lid latch in this fashion "wakes up" the microprocessor that is connected to the weight sensor and causes a measurement of the initial weight of the trough when empty. This weight value is typically used as a tare reference throughout the counting process so that only the weight of pills that are located in the trough will be subsequently measured.

The next operation is a calibration procedure whereby a unit piece weight is determined by weighing a known quantity of pills, which is nominally 10, but can be any number up to and including 30. The 10 pills are swept from the platform into the trough, and must be counted manually, in the same manner as the user would count them with a traditional manual counting tray. This step must be done with great care, since the counting accuracy critically depends on the accuracy of the initial piece weight.

Experience has shown that human error during the initial counting of the pills used in calibration can be substantially reduced by requiring the user to transfer two groups of five pills each. This procedure can be used in conjunction with microprocessor instructions to alert the user if both transfers are not approximately the same weight, allowing for some error due to the statistical variation of pill weight. Of course, a similar objective could be accomplished by transferring two groups of four (4) pills each or two groups of six (6) pills each or some other pair of uniformly sized pill groups. However, five pills per group is a convenient number that many users of manual trays have grown accustomed to using to achieve both efficiency and counting accuracy.

The successful transfer of two groups of five pills each causes the microprocessor to determine the total weight of the ten pills and to calculate, by dividing by 10, the average piece weight. At this point in the pill counting sequence, the display will show "10" to indicate the current count of pills in the trough. The user then proceeds to transfer one or more additional groups of pills to the trough, which generally comprise a random number of pills per group, until the desired pill count to fill the prescription appears on the display. The transfers can be accomplished either by moving pills from the platform into the trough with a spatula, or by pouring pills from a bulk-storage container directly into the trough if the height of the passageway is large enough to accommodate the latter. If the pill count in the trough inadvertently exceeds the desired count, one or more pills may be removed from the trough and returned to the platform using the spatula. The count for the remaining pills in the trough will then be updated and shown on the display.

When the desired pill count is shown on the display, or the trough is full, the user closes the lid by rotating it clockwise with enough force so that rib 70 of the lid travels past and disengages with the tapered surfaces of the lid latch. This action is detected by a Hall effect motion sensor and freezes the pill count to the value last shown on the display.

Before pouring the counted pills out of the trough and into a prescription container, the platform must be cleared of any remaining pills. To accomplish this, the user lifts the tray and tilts it backwards and to the right so that the remaining pills on the platform slide to the lowest corner (the far side right-hand corner) of the platform where they can be poured through the spout located there, and returned back to their bulk-storage container. Finally, the user tilts the tray forward to pour out the counted pills from the trough into a prescription container such as a vial.

After completing and dispensing a count, to start a new prescription count, the user simply opens the lid to the partially open position, and the display will automatically provide the appropriate user prompts for calibration. However, to continue counting additional pills for the current prescription, as in the case when the trough becomes full before the targeted count can be reached, the user will not open the lid upon completing and dispensing the first portion of the count. Rather, the user will select "Continuing Script" mode by pressing the switch. Upon moving the lid to the partially open position, the finalized count that was previously shown on the display is recalled and shown as the starting count, even though the trough is now empty. The user can immediately proceed by transferring groups of pills into the trough without repeating any steps for calibration, since the same piece weight that was established previously is also recalled and used. Counting will once again proceed until the desired prescription count is reached, or the trough is filled. This process can be repeated as many times as necessary to reach the nominal prescription count. Continuing Script mode is especially useful for doing stock inventory of pills, which is typically a routine and required operation in the pharmacy setting. Refer to FIG. 5A, which details the sequence of operations for Continuing Script mode.

It is important to explain why the designated number of pills for the calibration procedure in the above operational sequence was selected to be ten (10). Due to statistical variations observed in a typical pill's weight, in the range of 0 to 3% from the sample mean, it is preferred to use a number of pills that is substantially larger than one (1) in order to take advantage of pill-to-pill weight averaging that will tend to reduce the statistical variation in the subsequently calculated piece weight. This will tend to improve the accuracy in calculating the number of pills in the next group that is transferred. In fact, generally, the larger the number of pills in this initial group, the smaller will be the variation of the calculated piece weight from the true statistical average. On the other hand, if the designated number of pills used for calibration were too large, the time to manually count and transfer these pills into the trough would increase, as would the probability for making a human counting error. Clearly then, it is desirable to select a number that is not too large or too small. A value of ten (10) pills is an easy number for users to learn and remember. However in alternate configurations of the invention, values up to and including 30 pills could be employed. It is clear that one of the ways in which accuracy or speed may be selectively optimized is the selection of the initial pill quantity that is used in the calibration procedure.

Another way found to increase pill counting speed is for the tray to provide operator feedback on the time it takes to count each prescription. This can be accomplished by showing the time (say, in seconds) it takes, from start to finish, to complete a count, which would be displayed alongside the completed prescription count. Specifically, the start of the time duration would be when the lid is initially moved to the partially open position, and the finish would coincide with the freezing of the count as the lid is moved towards complete closure from the partially open position. It has been observed that the user will tend to reference this count time information as a gage to assess and improve his/her counting skills, and, sometimes, to compete with co-workers.

The above method of counting has been found to be easy for users to learn because it is only a minor variation from manual pill counting. But, most significantly, it has been determined that employing semi-automatic counting using this procedure can save a user in a typical pharmacy approximately two hours per day! The principal time-savings is due to the fact that larger groups of pills can be transferred to the trough and electronically counted in less time than is possible when manually counting. So, the objective of faster pill counting has actually been realized with this semi-automatic pill counting tray apparatus using the pill counting method described above.

A high level of performance with respect to speed and accuracy is due to the innovative approach employed by the semi-automatic pill counting tray apparatus. Use of the tray configuration provides the basis for being fast and easy to use. Use of a relative weight based approach provides accuracy without costly precision components. Use of efficient algorithms leverages the availability of inexpensive processing power to enhance both speed and accuracy.

In the approach presented in this patent application, the weighing load sensor must possess only good short-term drift characteristics, good linearity (that may be achieved by a factory calibration and a computational correction equation) and low noise (that may be enhanced by signal processing). Analog to digital conversion of the weighing load sensor's output signal must be of sufficient resolution so that its least significant bit (LSB) represents a weight small compared to the lightest pill type counted. The critical characteristics of precision scales such as high absolute accuracy and good long-term drift are not required.

Various counting algorithms depend not only on the system performance characteristics described above, but also on the statistics of the pills being counted. Again, the approach employed by the semi-automatic pill counting tray apparatus provides a high level of performance at a low cost. Industry trends in pill manufacturing favor the relative weight based approach. Modern pill manufacturing technology and in process controls (IPC) yield highly uniform pills. The imperative for this is because the quantity of active ingredient is often measured by pill weight, formulation also being tightly controlled. The Tableting Specifications Manual (TSM) published by the American Pharmacists Association (APhA) and ISO-18084 provide widely adhered to standards for tablet making machines for U.S. and international regions respectively. Current Good Manufacturing Practices (cGMP) stipulate FDA requirements for operation and control of pill formation. A further benefit available to the semi-automated pill counting tray apparatus is that uniformity is only required from the generally small, local supply of pills to be counted. That these have been manufactured within seconds by well-controlled, automated machines implies certain uniformity that is absent effects of any long term drifts in process controls. Consultation with a representative from the USP (United States Pharmacopeia), which provides the FDA with standards for tablet and capsule weight uniformity, as well as extensive weight sampling of various prescribed pills conducted during the development of the semi-automatic counting tray, confirm that the vast majority of prescribed pharmaceuticals exhibit pill weight variation up to about 3% RSD (relative standard deviation). As expected from a process with multiple independent elements, the distribution of pill weights has been found to be approximate normal (or quasi-Gaussian) permitting the appropriate use of a variety of Gaussian analysis tools and relationships in the design of pill counting algorithms.

Counting algorithms used in conjunction with the semi-automatic pill counting tray are all based on obtaining an initial piece weight by measuring the weight of a known number of pills. Subsequently, as additional, generally unknown, quantities of pills are added this original piece weight is used to estimate that number added. More sophistication is added by means for selecting the best rounding to utilize and by calculating piece weights of higher accuracy based on the additional pills counted.

The above introduction now leads to a discussion of a particularly useful counting algorithm. In counting objects such as pills, or other objects each having relatively similar weight, it is usually the case that a pre-determined number of pills, designated by the constant M (M equals ten pills in the previous discussion), comprising an initial group are manually counted and then weighed. M is the first parameter to be introduced in the counting algorithm. The initial average weight per pill, $w_0$, can then be simply calculated by dividing the total weight by M. The counting proceeds by adding a second group of pills to the trough. The added weight of this second group is then divided by $w_0$ (using the microprocessor) to estimate the number of pills added in this group. However, it should be emphasized that that this will only be an estimate because when the division is performed it is highly unlikely that the result will be an integer corresponding to the exact number of pills in the group. Rather, it is likely that the result will be some decimal number, $n_1$, that can be expressed as the sum of an integer, $L_1$, and a decimal remainder, $R_1$, that is less than one (1). This can be expressed mathematically as:

$$n_1 = L_1 + R_1 \quad (1)$$

where the subscript "1" associated with the letters n, L and R refer to the first group to be counted after the initial 10 pills (i.e. the second actual group). So, is $L_1$ the correct value for the number of pills transferred in the second group? The answer is not simple. It may be $L_1$. But, if $R_1$ is greater that 0.5, the total number may be $L_1+1$, which would logically follow by rounding off $n_1$ to the nearest integer value, as is usually (but not always) done when using this algorithm. However, it may also be that neither $L_1$ nor $L_1+1$ is the correct number of pills in the second group. This can happen if such a large number of pills are added to the trough in the second group that the cumulative error of their weight variations may exceed the weight of one or more pills. The only way to prevent this from happening is to set a limit on the total number of pills in the second group, which will also hold as the same limit for each group size thereafter. This number, referred to as N, is the second parameter to be introduced in the counting algorithm. Extensive analyses, including computational simulations as well as empirical studies, support the designation of limiting N to be in the range of 15 to 60 (pills). In the preferred embodiment of the invention 25 (pills), is sufficiently small so that the cumulative weight variations of the pills within each group transferred to the trough after calibration do not exceed the weight of a single pill to a very high level of statistical probability.

Continuing the discussion above, a rather surprising phenomenon which explains the reasoning behind a critical feature of the semi-automatic counting tray is that the total number of pills in the second group might actually be neither $L_1$, nor $L_1+1$. This can happen if such a large number of pills are added to the trough in the second group, that the cumulative error of their weight variations may exceed the weight of one or more pills. It is important to recognize that this type of error is independent of how "refined" the unit piece weight is; even with a "perfect" piece weight, which would be that of the entire population of pills from the stock container, this error would exist. Therefore, the only way to prevent this from happening is to set a limit on the total number of pills in the second group, which will also logically apply to each of the groups that follow, as well. This number, referred to as N, is the second parameter to be introduced in the counting algorithm. Extensive analyses including computational simulations and empirical studies support limiting N to be in the range of 15 to 60 (pills). In the preferred embodiment of the invention, 25 (pills) is sufficiently small so that the cumulative weight variations of the pills within each group transferred to the trough after calibration do not exceed the weight of a single pill to a high level of statistical probability. In fact, probability for counting error is less than 0.001% for pills with a weight variation (standard deviation) of 1% about the mean, and less than 0.08% for pills with a weight variation of 3.0%. Importantly, it should be noted that pills with a 3.0% variation are much less common among prescribed pharmaceuticals than those with closer to 1%. This algorithmic feature of the semi-automatic counting tray ensures highly accurate counts which set it apart from conventional weigh-counters, In comparison, the Bradley '763 and Rock U.S. Pat. No. 44,043,412 weigh scales, as well as conventional weigh-counters which are sometimes used in pharmacy settings, do not impose an upper limit to the batches of pills or, in the case of Rock U.S. Pat. No. 44,043,412, other items, that are placed on their scales. Since they compute the count by simply dividing the weight of the items by a unit weight, they are liable to make significant accuracy errors.

Thus for best accuracy, if the selected value for N is exceeded during the transfer of pills to the trough, the microprocessor is programmed to output a message to the display seen by the user restart the count. If the user approaches the value N without exceeding the value, the microprocessor is programmed to prompt the user to "SLOW DOWN", i.e. take care not to add larger groups.

The same general counting process is used for the third, fourth and any other subsequent group of pills that are added to the trough. For all such groups, Equation (1), above, can be generalized to be:

$$n_i = L_i + R_i \quad (2)$$

for the $i^{th}$ group of pills transferred to the trough, where i=1 corresponds to the first group transferred after calibration is completed.

Another novel feature has been included in this counting algorithm is to recalculate an increasingly more accurate value for the average pill weight after each successful group transfer. This new average pill weight, $w_i$, is determined by dividing the total weight of all pills currently in the trough by the total number of pills currently counted. Using such a revised average pill weight generally helps to improve the counting accuracy as the total pill count increases. However, the algorithm includes a restriction on the use of the revised average pill weight if the remainder $R_i$ is not sufficiently small, less than, say, 0.3 or sufficiently large, greater than, say, 0.7. If these criteria are not satisfied, the average pill weight is not updated because some uncontrolled factor, perhaps a badly chipped pill, has reduced the counting accuracy on the previous transfer to less than expected. This can be expressed mathematically by excluding the update in the average pill weight, $w_i$, and continuing to use the previous value of $w_{i-1}$ if:

$$A < R_i < B \quad (3)$$

where, in the above example, A=0.3 and B=0.7. So, two additional parameters, A and B, have been introduced into the counting algorithm. Typically, A is selected to be in the range of 0.3 to 0.4 and B is selected to be in the range of 0.6 to 0.7 to achieve high counting accuracy. The choice of A=0.3 and B=0.7 typically results in the higher accuracy.

There is one additional parameter that is also used in this algorithm. It is applied in certain counting situations where the remainder in Equation (2) above may exceed 0.5 but rounding off the pill count to the nearest integer value might possibly cause the resulting pill count to be one unit too low. Rather than having an unsatisfied customer who might complain about being one pill short, the normal round-off point for the remainder can be changed from 0.5 to a larger value of say, 0.7 so as to favor the customer getting the benefit of an extra pill in certain cases where the remainder $R_j$ is in the range:

$$Y < R_i < 1.0 \quad (4).$$

In the above example, Y=0.7 is a rather good choice to achieve what is known as "conservative counting" that favors giving the customer one extra pill in uncertain situations rather than repeating the entire count. This makes good business sense when the value of a pill is less than the cost of a recount or the value of customer satisfaction.

Since various counting situations may be encountered at a pharmacy or elsewhere, a feature has been added to the counting tray design to allow the user to select a preferred pill counting mode as well as other programming options. Before starting a counting sequence, a user can press and hold down the tray's switch for three (3) or more seconds to initiate via the display a series of programming options including a choice of operating modes (normal or high accuracy) as well as other options such as adjusting the brightness of the display, adjusting buzzer volume, adjusting the display's text size, and even personalizing the tray so that it will display "Hi Dave (user's name)" when first turned on. Sounding the buzzer can be used as a positive means for confirming a programming selection.

An important aspect that was not elaborated upon in the above discussion of pill counting is how the display can be frozen to its current value when the lid associated with the trough is closed. Bradley '763 mentions the use of switch to detect the closure of the lid " . . . a cover switch [lid switch] will act as a finish sensor by detecting the closure of cover which signals the end of the measuring process so that a final count can be calculated." However, during the development of the present apparatus, it was determined that the lid could occasionally touch the pills in the trough before switch closure was complete, especially when counting large numbers of pills that tend to completely fill the trough. This would not pose a problem if the weight load sensor were located under the platform as is typical in Bradley '763. However, if the weight load sensor is located under the trough, as in the present design, and contact occurs between the lid and any pills in the trough, the weight of the lid could partially add to the weight of the pills in the trough and thereby provide an erroneous pill count result. To avoid this source of error, a special switch has been employed that senses lid closure after the lid starts to move but well before it is fully closed. It is important that the act of switch closure does not convey any mechanical force to the trough that could affect the pill count. This objective has been achieved by using a small permanent magnet that is bonded to the lid that passes closely by (but does not touch) a fixed Hall effect sensor switch when the lid when the user starts to close the lid from the partially open position used during counting. Use of such a Hall effect sensor switch or any other type of device to sense partial lid closure for preserving the counting accuracy of the semi-automated tray when the weighing load sensor is located under the trough was not recognized in Bradley '763 nor in any related prior art. However, the general operation of Hall effect sensors is well known and they are used in numerous commercial applications. In addition to the use of a Hall effect sensor switch, other non-contact sensor switches, like a magnetic reed switch or an opto-electronic sensor employing, say, a fixed light emitter and photo detector in conjunction with a small reflector attached to the moving lid, may also be used for this important function. However, it has been determined that the Hall effect sensor switch is preferred to a magnetic reed switch because the latter may give occasional false closure signals caused by ambient vibrations. The Hall effect sensor switch is also preferred over an opto-electronic switch that requires more careful initial alignment that must be maintained over time.

Another aspect that was not elaborated upon in the above discussion of the pill counting operation is that any change in the weight of the pills to be counted for any reason, such as moisture pick-up due to humidity changes, has no effect on counting accuracy because the first ten pills serve as the weight reference rather than some absolute pill weight value that might be available from the manufacturer or from a previous count of the same type of pills. So long as the moisture pick-up is similar for all of the pills currently being counted, there is no need to apply any correction factor for variations caused by humidity or for any other variations in pill weights due to different production lots, etc.

A final detail that that was not elaborated upon in the above discussion of pill counting operation is that the touch sensitive switch, that is activated either with a light finger touch or a light tap of a spatula, is the result of an innovative design developed specifically for the semi-automated pill counting tray. While capacitive-sensing switches having light touch sensitivity have been highly developed for numerous consumer products, these switches are not able to sense the tap of a plastic spatula, which has insufficient capacitance. Since tray users often prefer to use a tap of a spatula to activate the switch, a special low-force sensing switching device has been developed specifically for the semi-automated pill counting tray that works well with both finger touch and a tap of a spatula. In operation, the conventional analog output from a commercially available force sensor is directed to an analog to digital converter for digitization. The digitized signal is then passed on to the microprocessor that has been programmed to have a low digital threshold for establishing that the force sensor has been touched or tapped. The result is the adaptation of the force sensor into a very sensitive switching device. The desirability of this type of innovative switch design was not recognized in any prior art.

In some cases, manual-only pill counting trays are manufactured from plastics having a variety of colors with certain colors dedicated to trays used to count pills having certain similar chemistries while different colored trays are used in cases where cross-contamination due to leftover dust and other surface residuals might cause harm to a patient if any cross-contamination were to occur when filling his/her prescription.

Some or all of the structural parts of the semi-automatic counting tray, including all parts that come in direct contact with pills, should be made from a light-weight material that is strong, impact resistant, and safe for use when handling food items. For a number of applications, as will be subsequently discussed, it is also desirable to have trays with different colors. However, it is desirable to have the trough lid made of a transparent plastic so that the user can see the pills in the trough even when the lid is closed and observe when all of the pills have been poured out of the trough.

A food grade polycarbonate resin has been qualified and is a preferred choice to satisfy the above criteria. However, other plastics with similar properties might also be acceptable after qualification. And certain additions to the polycarbonate resin, like ABS (Acrylonitrile-Butadiene-Styrene) to enhance impact resistance, may be acceptable so long as these blends are made up with at least 75% polycarbonate resin and qualification proves them to be acceptable.

Furthermore, there might be advantages associated with using thin light-weight amorphous metals for some structural components that do not normally come in contact with pills. For example, an amorphous magnesium alloy similar to the "Liquid Magnesium" material that is used to form some cell phone and lap-top computer housings would offer the added benefit of higher strength than plastic and could possibly serve as an electromagnetic shield for the semi-automatic pill counting tray's electronic circuitry. However, amorphous magnesium is considerably more expensive than polycarbonate resin.

The motivation for having different colored trays is to eliminate the need for cleaning the surfaces contacted by pills having different chemistries. While having a set of different colored trays is practical when using inexpensive manual counting trays (costing between $3 and $15 each), there could be a substantial price resistance to acquiring a similar set of semi-automated pill counting trays that are more expensive. A practical way to resolve the issue of cross-contamination when using a semi-automated pill counting tray apparatus is to offer users a series of different colored plastic liners that are inexpensive to manufacture and easy to both snap into place and to remove. One plastic liner in a set of two with a common color would be used to cover the platform and the other used to cover the trough. These liners are made from plastic materials, preferably nucleated polypropylene, similar to those used to make inexpensive food storage containers with snap-on covers that are sold in almost every grocery store. The liner for the platform is made to snap securely onto platform's rim and the addition of several small inward directed tabs on both lips of the trough are used to secure a plastic liner to the trough by a light downward press fit. While various techniques can be used to fabricate such liners, thermoforming the desired shapes starting with thin sheets of polypropylene, approximately 0.9 mm thick, has proven to be practical. (See Pub. No.: US2012/0048874 A1, SEALABLE SNACK CONTAINER.)

BRIEF DESCRIPTION OF THE DRAWINGS

The above SUMMARY OF THE INVENTION as well as other features and advantages of the present invention will be more fully appreciated by reference to the following detailed descriptions of illustrative embodiments in accordance with the present invention when taken in conjunction with the accompanying drawings, wherein.

DETAILED DESCRIPTION OF THE DRAWINGS

Figure 1A:
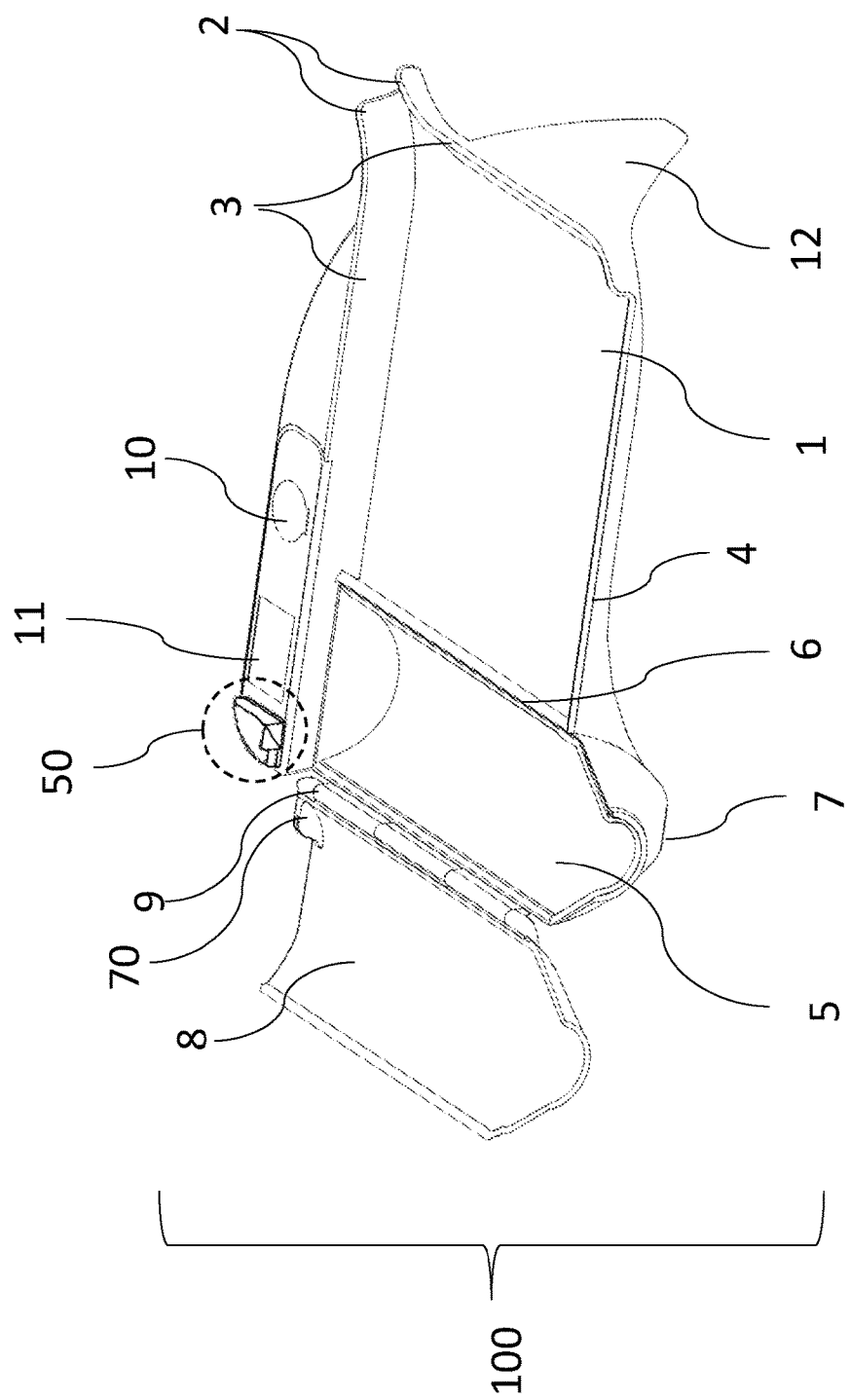
FIG. 1A is a perspective view of a semi-automatic pill counting tray in accordance with the principles of the present invention.

Referring to FIG. 1A, a pill counting tray apparatus 100 is shown that is designed to set on a flat horizontal surface such as a countertop. This apparatus is approximately 24 cm wide, 18 cm deep and 5 cm high. Apparatus 100 rests upon compliant visco-elastic foot-pads (not shown in this figure but included in FIG. 3C) secured to the bottom of the counting tray apparatus. The flat platform 1 has a spout shaped opening 2 at the back right-hand corner and raised rim sections 3 on the back and right hand edges of the platform 1 that are higher (approximately 12 mm high) than the rim section 4 on the front edge of the platform (approximately 2 mm high). The function of these rim sections is to contain pills that are placed on the platform 1. The reduced height of the rim 4 is to accommodate the user's motion of a spatula, as discussed next. In operation, some or all of the pills (not shown) to be counted are initially placed on platform 1 usually by pouring them from a bulk-storage container (not shown). A group of these pills on platform 1 are moved to the trough 5, typically using a swiping motion with a spatula (not shown) that moves the pills over a narrow slot 6 between the platform 1 and the trough 5. The primary function of the slot 6 is to provide clearance between the platform and the trough.

The geometry of the slot 6 precludes dust from pills from entering the space beneath the trough where it might obstruct proper operation of the weighing load sensor. The pills that enter the trough 5 are either manually counted or they are electronically counted using a weighing load sensor (not shown in this view) that is located under trough 5. The trough 5 is located within the outer trough shell 7. A lid 8 is secured to the trough shell 7 by a hinge 9. This lid 8 may be rotated about the hinge 9 to cover the trough 5. The view of the pill counting apparatus shown in FIG. 1A shows the lid in its open position. To initiate a semi-automatic pill counting sequence, the user first rotates the lid 8 so that the rib 70 associated with the lid 8 engages with the latch assembly 50 to cause the lid 8 to be fixed in a partially open position (as shown in FIG. 1C). Then, the user manually counts and transfers two groups of 5 pills each from the platform 1 to the trough 5. The microprocessor then verifies that the individual group weights are approximately the same to prevent user error that is typical with manual counting. The microprocessor then calculates the piece weight per pill by dividing the total measured weight of pills in the trough by ten (10). From that point forward in the counting sequence, the user is not required to make further pill counts because the counting process is under total electronic control. The user is only required to manually transfer uncounted groups of pills into the trough 5 and observe the total count of the pills in the trough 5 that is shown in the display 11. When pill counting tray apparatus 100 is set on a horizontal surface, it rests on the foot-pads (not shown) on the bottom of the trough shell 7 and support leg 12.

Figure 1B:
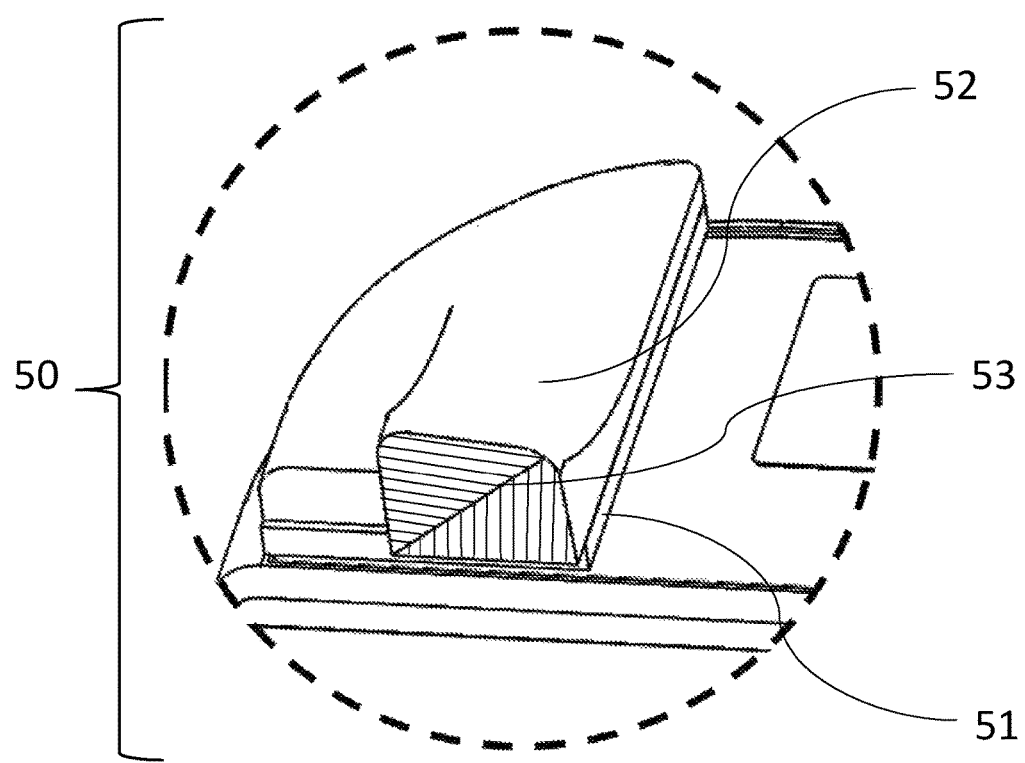
FIG. 1B is an enlarged perspective view of the latch assembly shown in FIG. 1A.
Figure 1C:
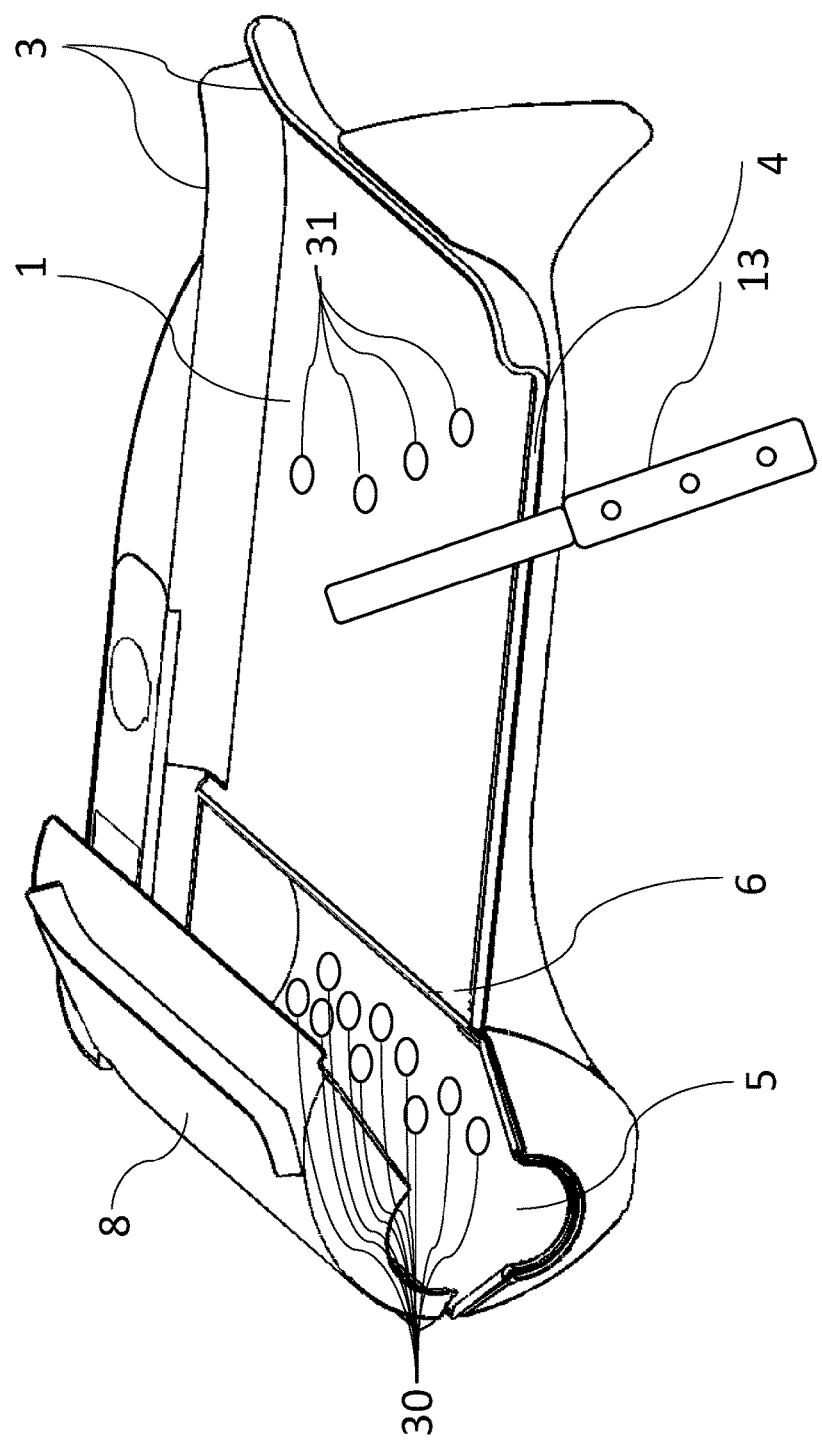
FIG. 1C shows how the pill counting tray would appear after the first ten (10) pills are transferred to the trough using a spatula.

FIG. 1B is an enlarged perspective view of the latch assembly 50 shown in FIG. 1A. This latch assembly is comprised of two parts, a compliant adhesive mounting pad 51 and a rigid latching block 52 that has a vertical face that is beveled 53 along its diagonal causing a modest outward protrusion from the vertical surface along this bevel. In operation, when the lid 8 is rotated with light force by the user, the rib 70 on the trough lid 8 (shown in FIG. 1A) engages this beveled vertical face 53 of the latch assembly 50. When the user subsequently lets go of the lid, friction between the rib 70 and the beveled vertical face 53 prevents the lid from closing on its own. When the transfer of all of the pills required to fill a prescription is complete, the user applies a somewhat greater rotational force (torque) on the lid 8 to cause it to fully close. When this is done, the compliant adhesive mounting pad 51 deforms a small but sufficient amount to allow the closure to proceed without damage to either the rib 70 or the rigid latching block 52.

FIG. 1C shows how the pill counting tray apparatus 100 would appear after the first ten (10) pills 30 are transferred to the trough 5 using a spatula 13 while some uncounted pills 31 remain on the platform 1. The lid 8 is positioned as shown in the partially open position that is required for counting. This lid position provides a passageway between the free edge of the lid 8 and the top surface of platform 1 for pills to be swept from the platform 1 into the trough 5 while still protecting the trough from air currents and certain electrostatic forces that could interfere with the count.

Figure 1D:
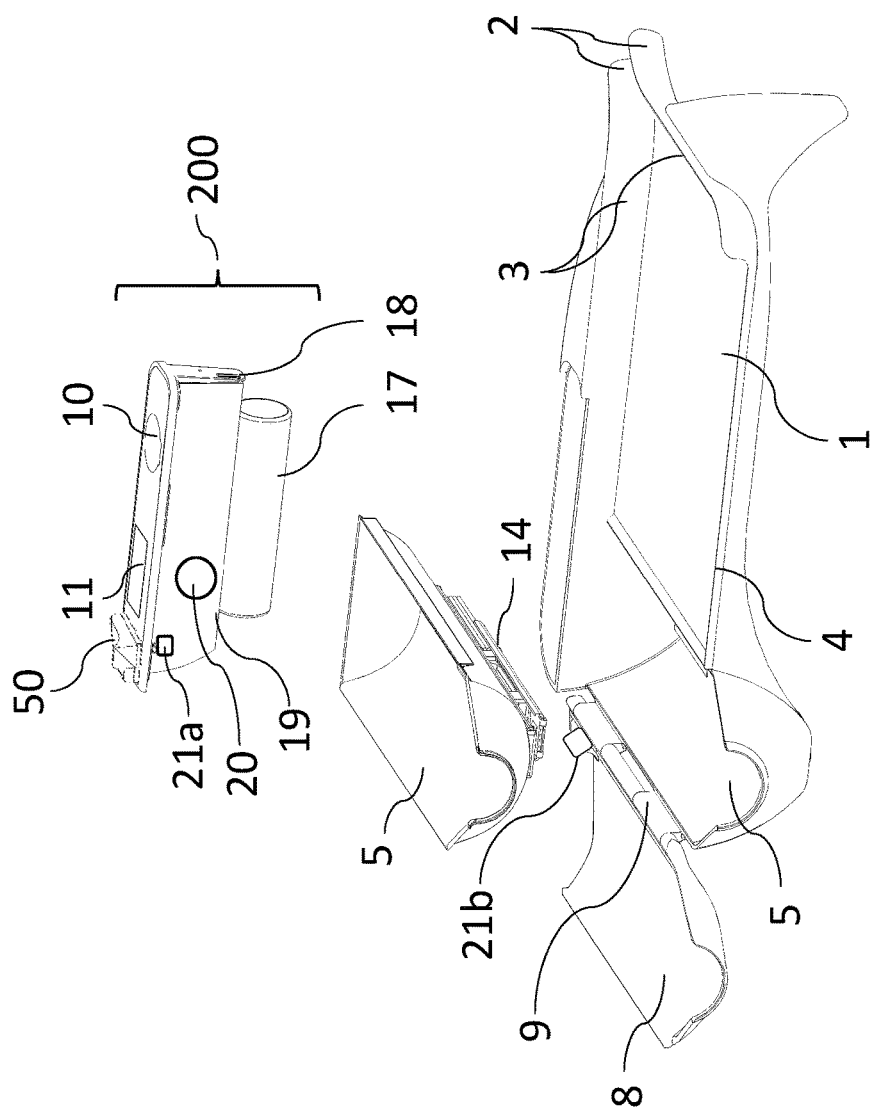
FIG. 1D is an exploded view of the semi-automatic pill counting tray shown in FIG. 1A.

FIG. 1D is an exploded view of the same pill counting tray apparatus 100 that is shown in FIG. 1A. In this view, the weighing load sensor 14 can be seen directly below the trough 5 where it is secured in place to the lower surface of the trough 5. Also shown in this view is the electronic control module 200 that includes a switch 10, a display 11, a battery 17, an Input/Output (I/O) connector 18 that is typically a USB connector, a circuit board 19 with microprocessor (not shown), buzzer 20 that optionally is sounded for a limited period to alert the user to look at the said display 11, and a Hall effect sensor switch 21a. The Hall effect sensor switch 21a is activated when a small magnet 21b secured to the rib 70 moves within proximity of the Hall effect sensor switch 21a. It should be noted that the magnet 21b is secured to the surface of the rib 70 that does not directly engage with the latching assembly 50.

Figure 2A:
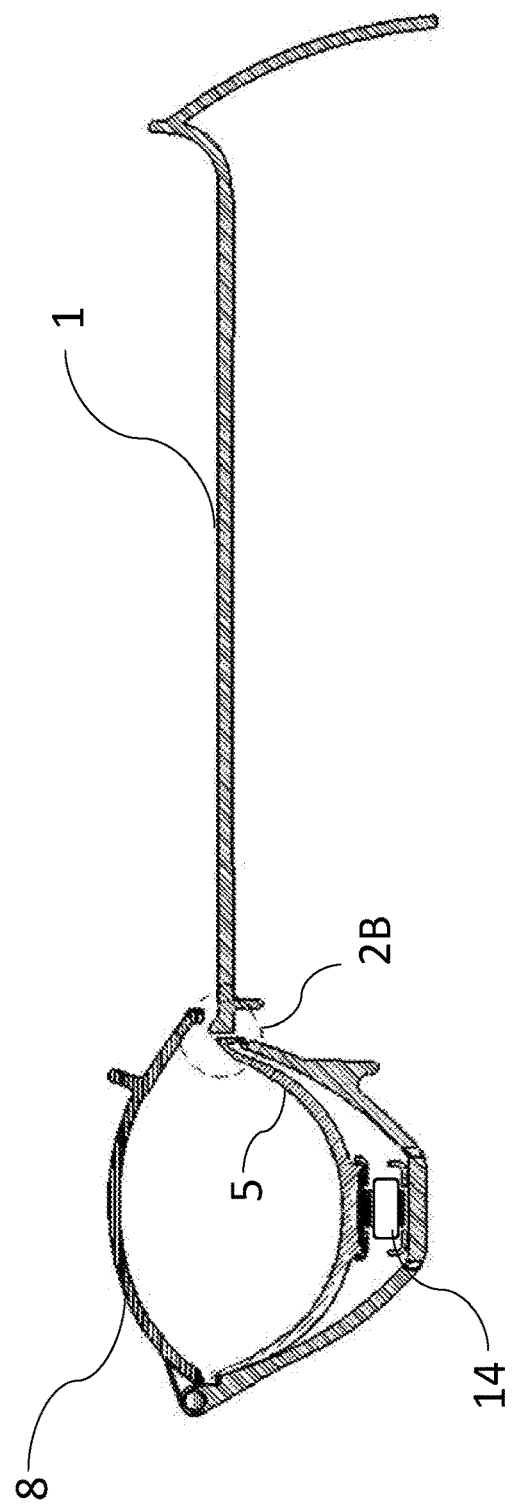
FIG. 2A is a cross-sectional view through the middle of the semi-automatic pill counting tray shown in FIG. 1A.

FIG. 2A is a cross-sectional view through the middle of apparatus 100 with the lid 8 in the closed position directly over the trough 5. A small dotted circular region in this drawing labeled 2B is enlarged and shown in FIG. 2B.

Figure 2B:
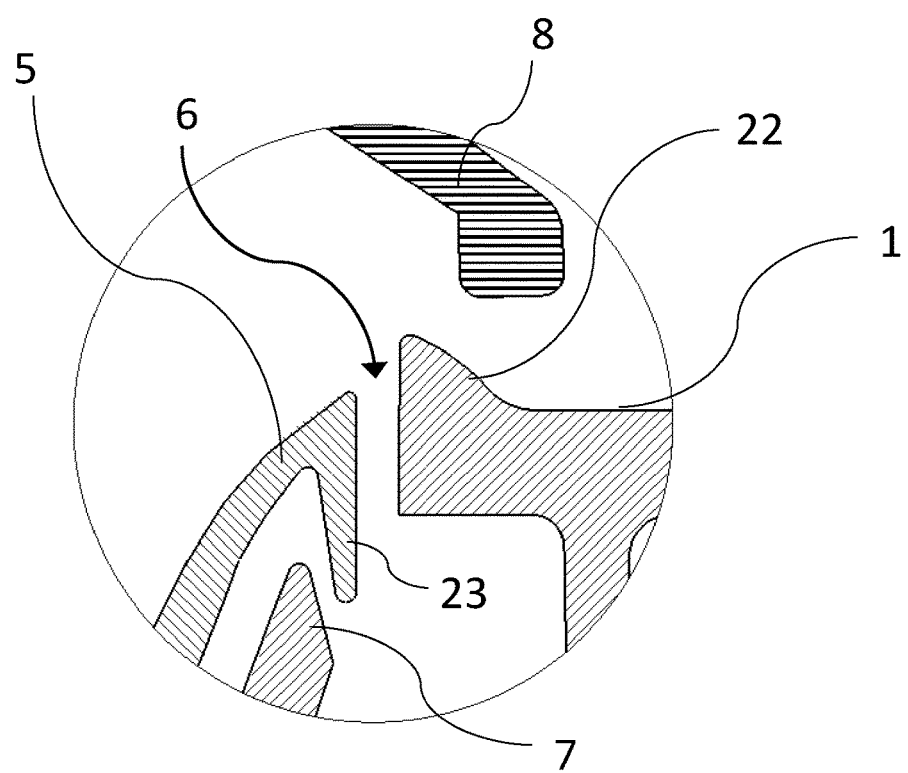
FIG. 2B is an enlarged cross-sectional view showing the region circled in FIG. 2A.

FIG. 2B is an enlargement of the dotted circular region shown in FIG. 2A. Here it can be seen that platform 1 has a slightly raised edge 22, in the range of 0.4 to 2.0 mm high, where it meets the trough 5. The small slot (opening) 6 can be seen between the raised edge 22 and the trough 5. One can also see a substantially vertical lip 23 on the top edge of the trough 5 that extends downward. Also shown are a portion of the trough shell 7 and a portion of the lid 8.

Figure 2C:
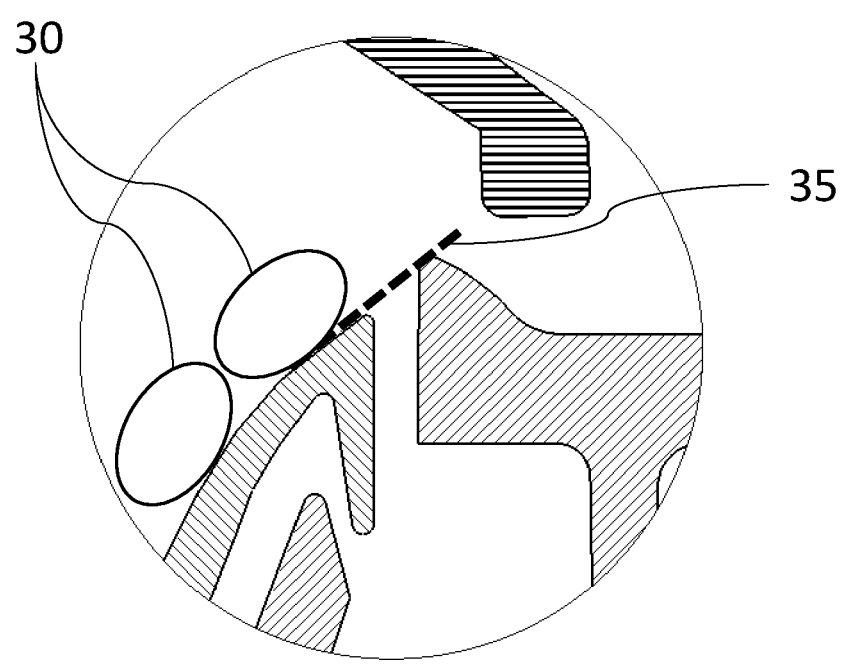
FIG. 2C is another enlarged cross-sectional view showing the region circled in FIG. 2A with two pills in place.

FIG. 2C is the same view as show in FIG. 2B with the inclusion of two pills 30 of typical size. As can be seen, slot 6 is wide enough to pass any dust from pills or small chips from pills as a group of pills is moved from platform 1 over slot 6 to the trough 5 but not nearly wide enough to pass an entire pill. This is accomplished by making the width of the slot approximately one third of the smallest dimension of the smallest pill that will be counted (approximately 2 mm). The slot 6 extends (normal to the plane of this figure) along the entire the entire length of the intersection between the platform 1 and the trough 5 as previously show in FIG. 1A. This slot 6 serves two important functions. The first is to provide a pathway to minimize pill dust and chips from entering the trough 5 and thereby adding uncontrolled extra weight to the trough that could possibly result in an incorrect pill count. And the second function of slot 6 is to provide an entrance to a substantially vertical channel that forms a direct pathway from the top of the left hand edge of platform 1 to the bottom of the entire pill counting tray apparatus 100. This vertical channel functions, in conjunction with a trough shape in the form of a lip 23 to baffle pill dust and chips from entering the volume under the trough 5 and above the trough shell 7 and possibly affecting the operation of the weighing load sensor 14 (not shown in this view) that is located in this volume.

Another important design aspect of the pill counting tray apparatus 100 is shown in FIG. 2C. Specifically, it can be seen that the dotted straight line 35 touching the highest point on the slightly raised edge 22 of the platform 1 and tangential to the inner surface of the trough 5 is inclined at a considerable angle to the horizontal, typically in the range of 30 to 80 degrees. This feature is essential to avoid pills from coming to a resting position that could bridge the slot 6 opening between the platform 1 and the trough 5. If such bridging were to occur, the pill's weight would be divided with some fraction supported by platform 1 and the remaining fraction supported by the trough 5. Since the weighing load sensor 14 can only detect that portion of the pill's weight that is supported by the trough 5, it would be possible for an inaccurate pill count to occur if the pill were only partially supported by the trough 5. The raised edge 22, having a height in the range of 0.2 to 4 mm, also precludes pills from coming to rest so near to the edge of the platform 1 that they might interfere with closure of the lid 8.

Figure 2D:
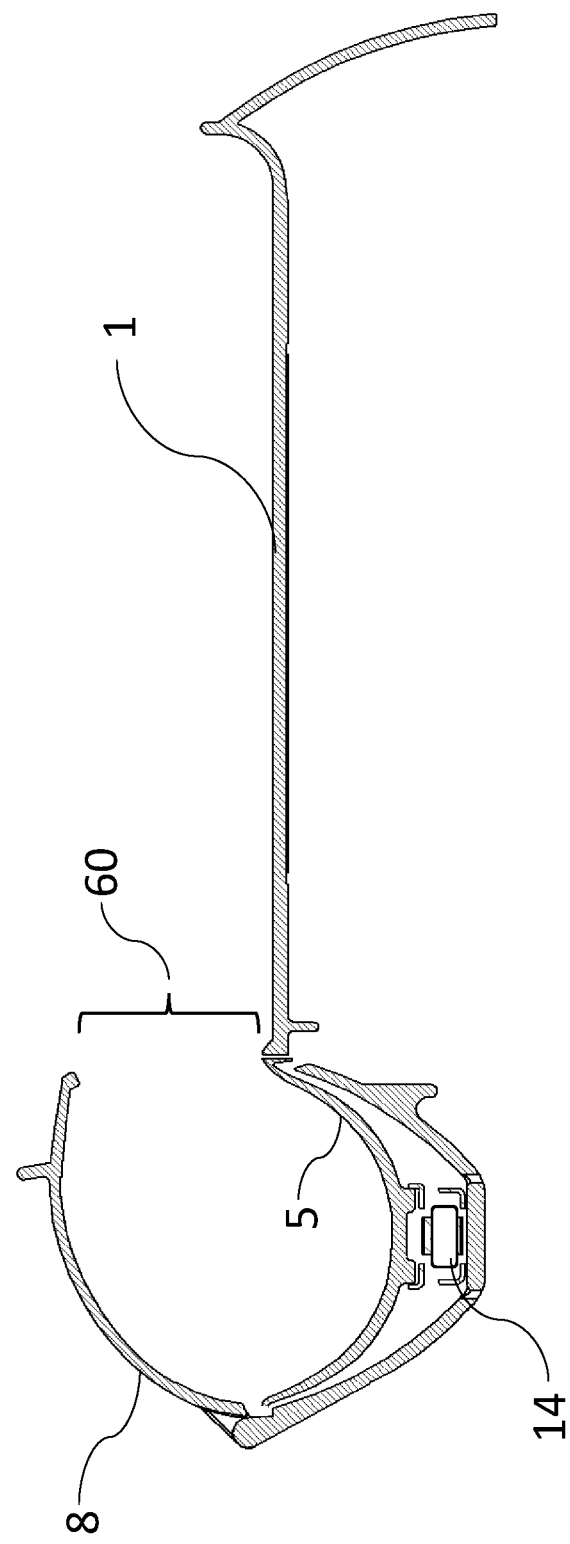
FIG. 2D is a cross-sectional view of the semi-automatic pill counting tray with its lid partially open.

FIG. 2D is the same view as shown in FIG. 2A with the lid 8 positioned in the partially open state. Pills are swept from the platform 1 to the trough 5 through the passageway 60, and the weight of the additional pills is registered on the load sensor 14. The lid latch assembly holds the lid in this position.

Figure 3A:
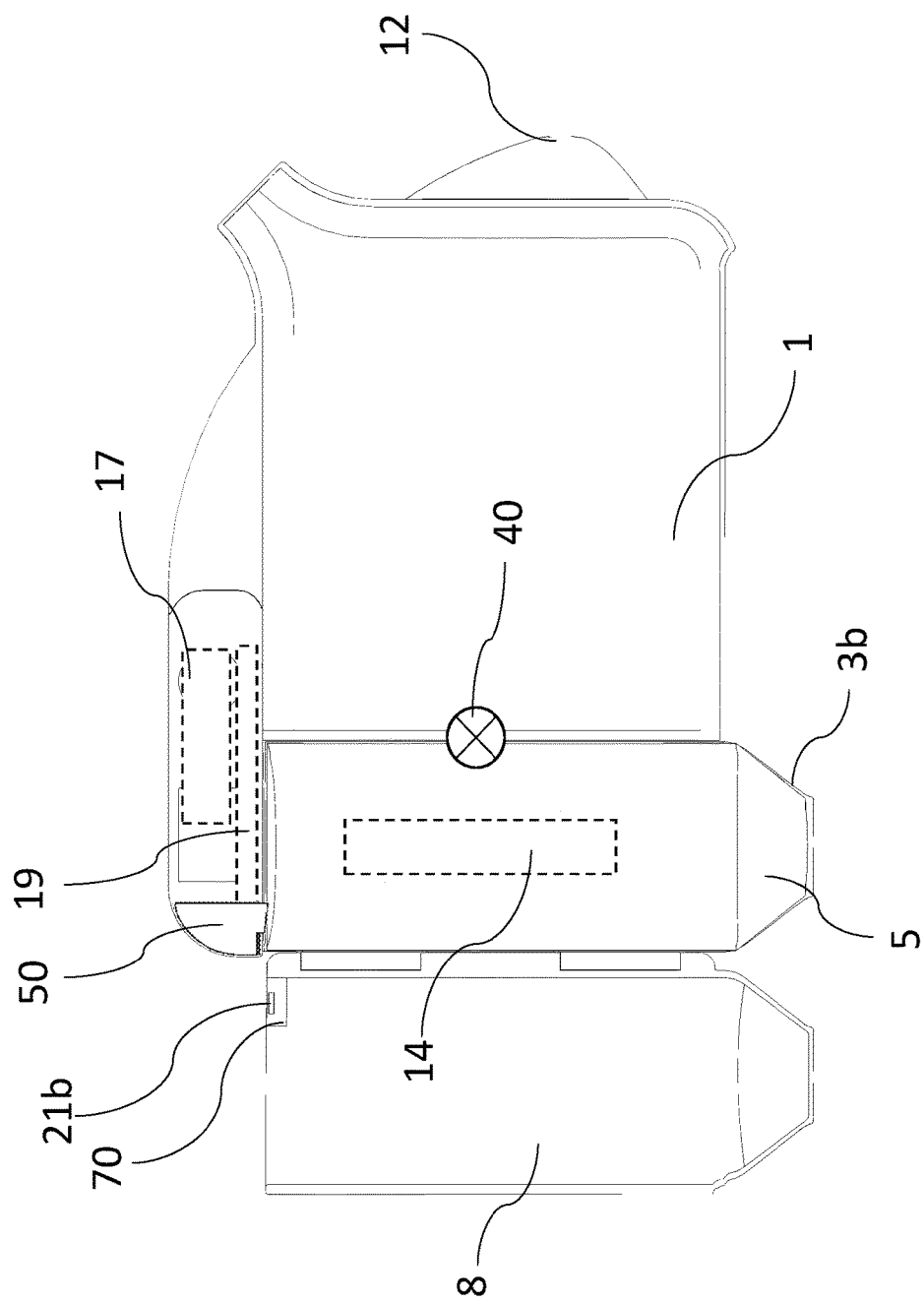
FIG. 3A is an overhead view of the apparatus in FIG. 1A that shows the preferred locations of the weighing load sensor, printed circuit board, and battery in relation to the center of gravity of the tray.

FIG. 3A is a top view of the pill tray counting apparatus 100 with its lid 8 in an open position. Experience has established that users typically pick up the tray apparatus 100 to pour pills out of the trough 5 by first gripping the closed trough with their left hand. When the apparatus 100 is picked up in this way, it has been found to be desirable to have the center of gravity 40 for the apparatus 100 (when the lid is closed) to be within approximately 5 centimeters to the right of the axial centerline of the trough 5 to limit the torque experienced by the user on his/her left hand. If the center of gravity were substantially to the right side of the apparatus 100, an undesirable torque would be experienced by the user's hand during lifting and movement. The location of the center of gravity 40 is substantially influenced by the weight of the battery 17, printed circuit board 19, and weighing load sensor 14. It is therefore desirable to locate as many of these components as practical to be near to the trough 5 as shown in this drawing and not under the center of the platform where Bradley '763 positions the printed circuit board in his FIGS. 1, 4 and 5. Although the center of gravity 40 should be in the vicinity of the trough 5, it should not be to the left of the axial centerline of the trough 5, because this would make the apparatus 100 unstable when set upon a level surface such as a table or counter, and cause it to tip down on its left side. For ease of handling, the total weight of the apparatus 100 is advantageously kept low as well, to nominally 330 grams, while an apparatus weight of one pound (454 grams) is recognized as the maximum practical limit.

Figure 3B:
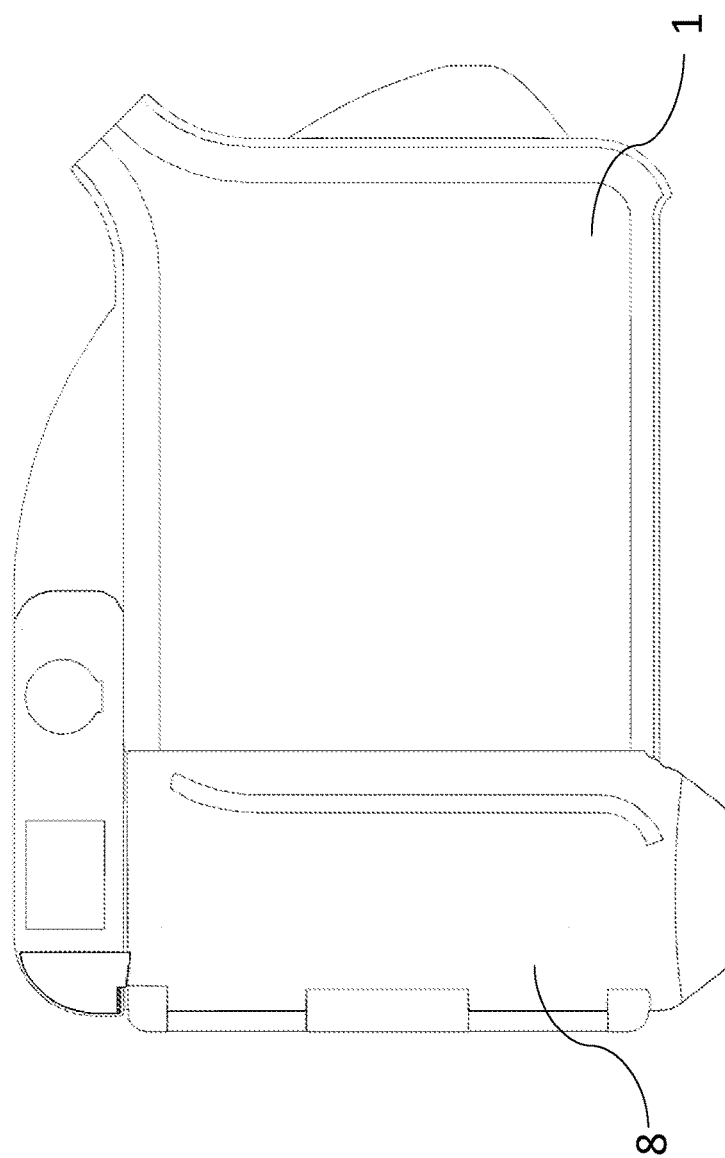
FIG. 3B is an overhead view of the device in FIG. 3A with the lid closed.

FIG. 3B is a top view of the apparatus 100 showing the lid 8 in its fully closed position. The lid 8 is normally closed to this position after the proper pill count in the trough 5 has been achieved and before the pills in this trough 5 are poured out of its funnel-shaped end into a prescription container. Pouring is accomplished by the user by lifting the apparatus 100 and tilting it forward so that pills in the trough 5 slide out under the force of gravity. The lid 8 is advantageously made of substantially transparent material allowing the user to verify that all pills have been emptied.

Figure 3C:
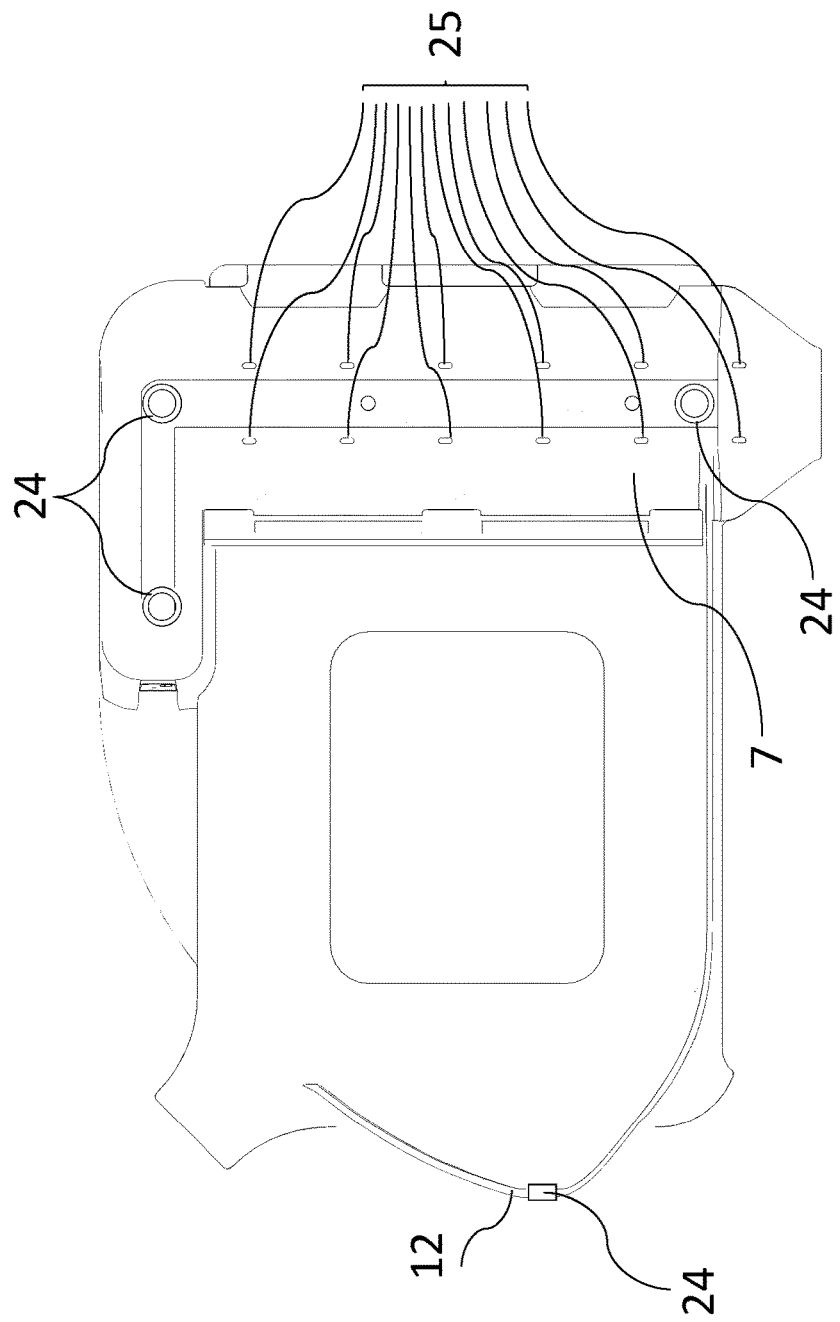
FIG. 3C is bottom view of the device in FIG. 1A with the lid closed.

FIG. 3C is the bottom view of the apparatus 100. This view shows four compliant viscoelastic foot-pads 24 which support the tray in conjunction with leg 12 when the tray is placed on a horizontal surface. Also shown in this view are a series of short slots 25 in the trough housing 7 that have been included to eliminate any liquid or particulate contamination that might inadvertently come to rest in the bottom of the trough housing 7. Tests were conducted to identify a suitable material to be used in the foot-pads 24 in order to mitigate (dampen) unwanted ambient vibrations. A viscoelastic polymer, Sorbothane®, has been selected. Specifically, Sorbothane® (made by Sorbothane, Inc., 2144 State Route 59, Kent, Ohio 44240), has been selected. Sorbothane® with durometer ranging from 30 to 60 durometer was particularly well suited when molded into cylindrical feet with a diameter of 5-7 mm and thickness of 2-3 mm.

Figure 4:
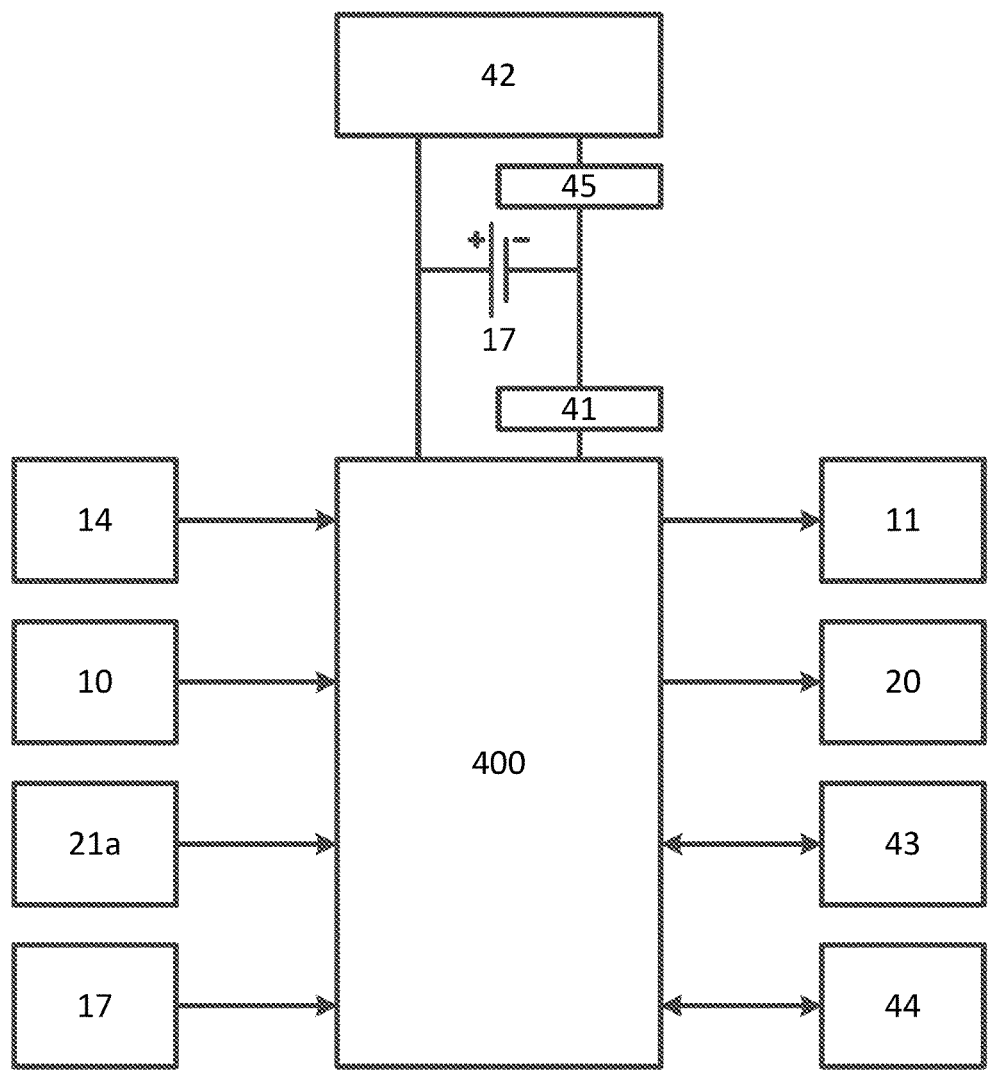
FIG. 4 is an electrical schematic block diagram associated with the apparatus shown in FIG. 1A and FIG. 1C.

FIG. 4 is a block diagram for the electrical circuit that is used to operate apparatus 100 in its semi-automatic pill counting mode. The microprocessor 400 has various inputs and outputs. The inputs include (1) operating voltage supplied by a battery 17 through a voltage regulator 41 and backed up by an external battery charger 42 that is operated in conjunction with a charging control circuit 45, (2) a weighing load sensor 14, (3) a switch 10, and (4) a Hall effect sensor switch 21a. The outputs from the microprocessor include (1) drivers for the display 11, and (2) driver for the buzzer 20. In addition, the microprocessor has sufficient inputs/outputs to operate with an optional accelerometer sensor 43, and input/outputs for external programming and de-bugging 44. The accelerometer sensor 43 may be used to enhance counting by compensating the load cell performance when the apparatus is used an uneven surface.

Figure 5A:
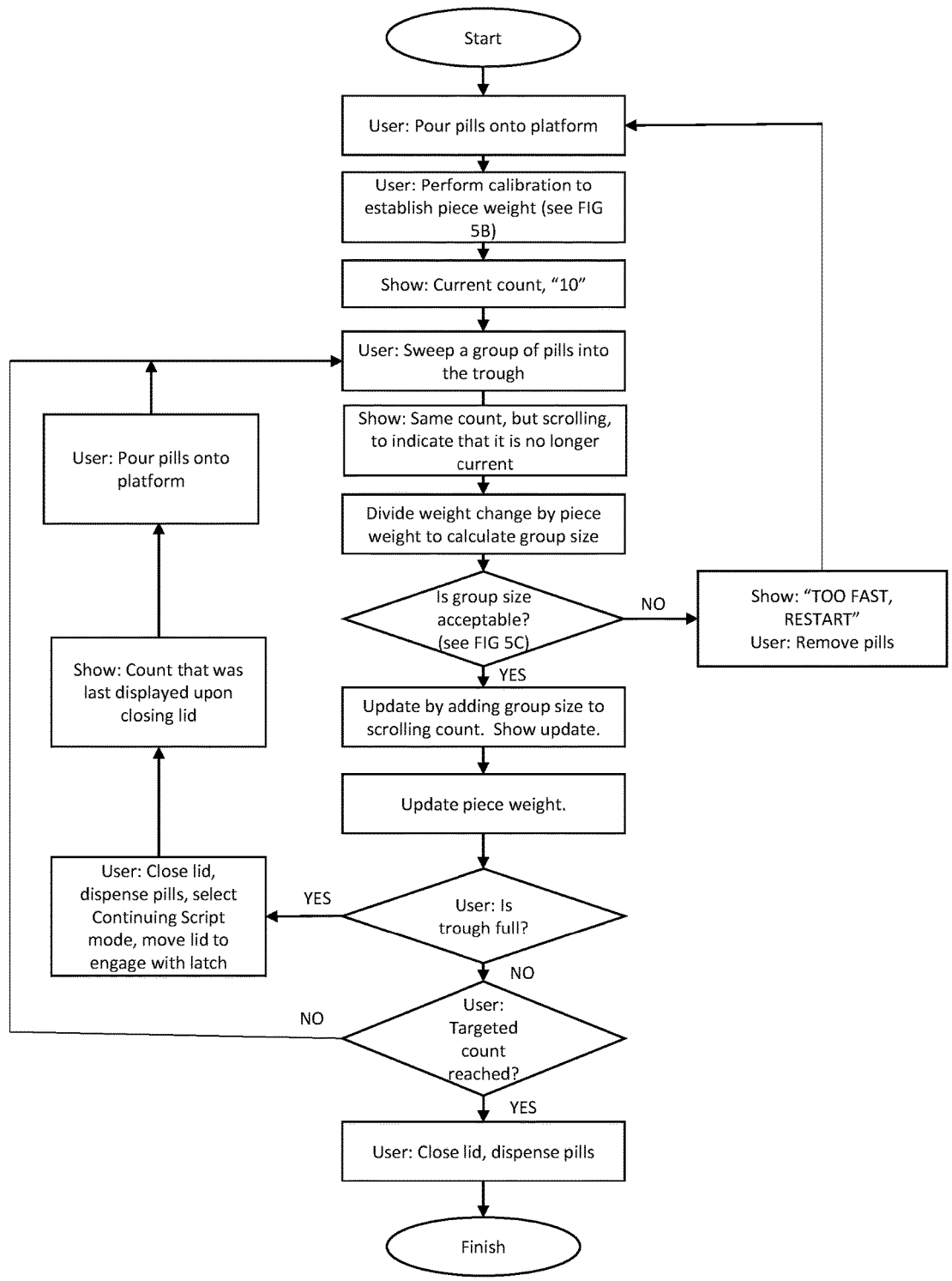
FIG. 5A is a flow chart representing one of the ways for semi-automatic operation for the tray shown in FIG. 1A.

FIG. 5A is a flow diagram showing a typical sequence for semi-automated operation of the pill counting tray apparatus 100. This diagram shows the START of the semi-automatic pill counting sequence at the top of the diagram and the FINISH of the counting sequence at the bottom of the diagram as well as all of the intermediate counting steps that are performed either manually by the user or automatically by the microprocessor. Two of the steps (sub-routines) shown in this figure are elaborated in FIG. 5B and FIG. 5C.

Figure 5B:
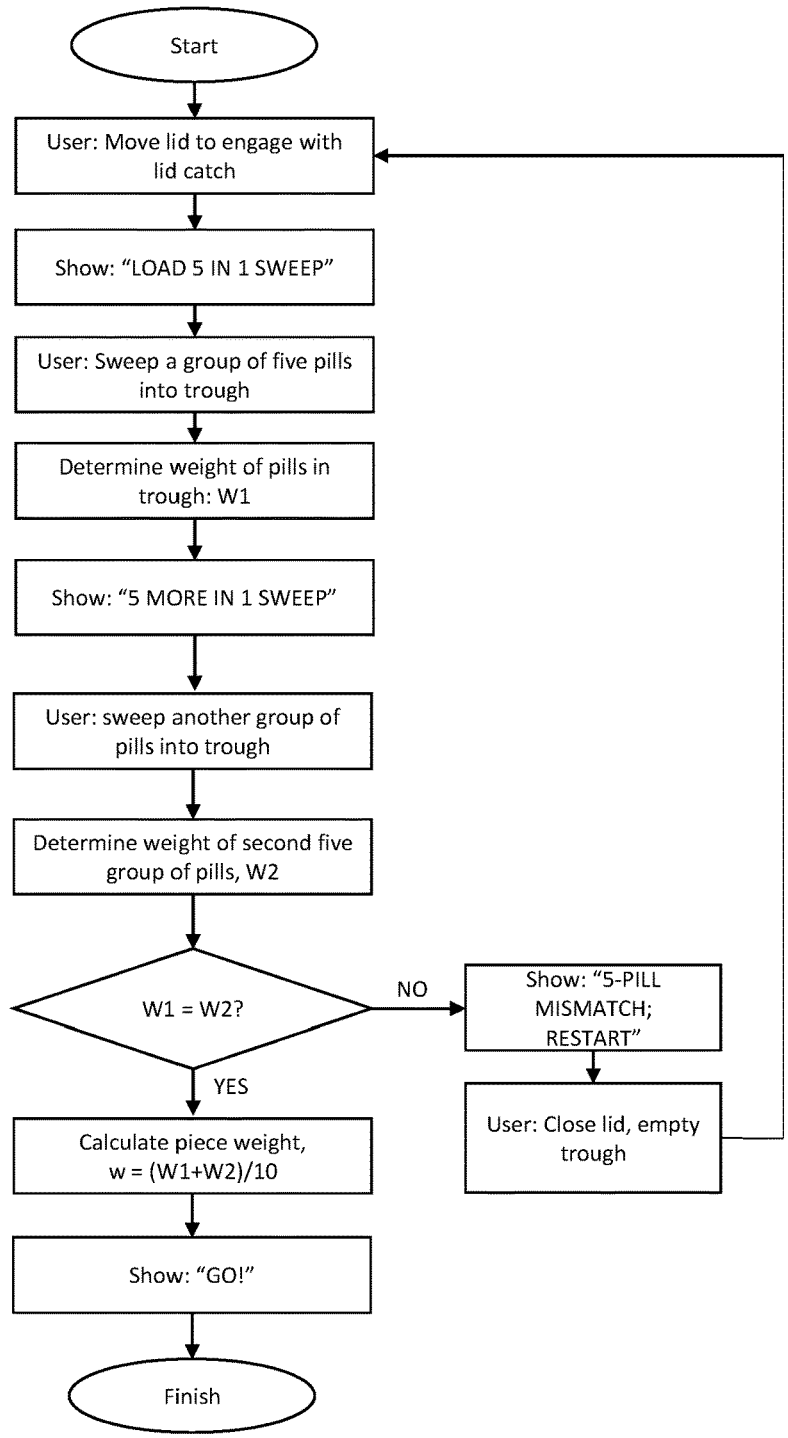
FIG. 5B is a flow chart of the sub-routine in FIG. 5A that elaborates upon the step titled "User: Perform calibration to establish piece weight"

FIG. 5B is a flow chart of a sub-routine that elaborates upon the step titled "User: Perform calibration to establish piece weight" in the overall flow diagram 5A.

Figure 5C:
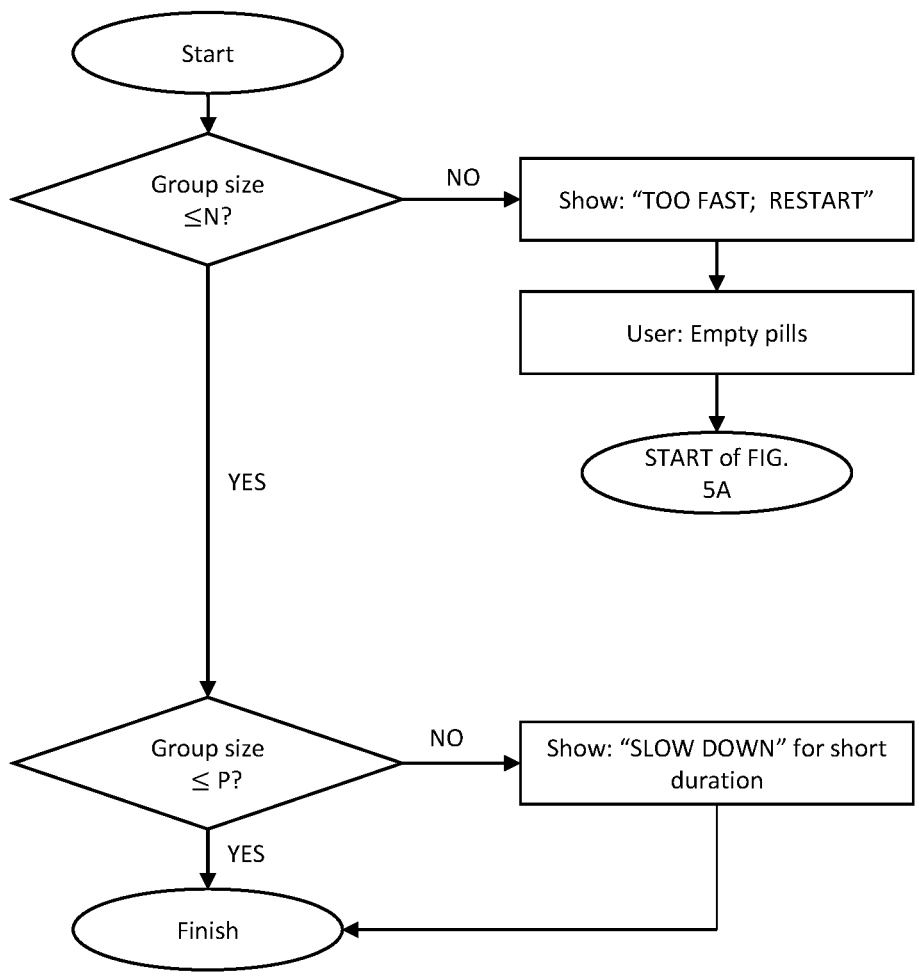
FIG. 5C is a flow chart of the sub-routine in FIG. 5A that elaborates upon the step titled "Is group size acceptable?"

FIG. 5C is a flow chart of the sub-routine that elaborates upon the step titled "Is group size acceptable?" in the overall flow diagram 5A. The parameter N, defined as the maximum acceptable group size quantity, is nominally assigned a value of 25 in the preferred embodiment of the invention. The parameter P is defined as the preferred group size quantity, and is nominally assigned a value of 15 in the preferred embodiment. The establishment and use of parameter P allows the microprocessor to provide helpful feedback to the user via a display prompt to "SLOW DOWN" when he/she transfers groups exceeding this quantity. In this manner, the user may readily learn how to transfer more ideal group sizes that are substantially smaller than N, in order to achieve the best possible counting accuracy, while at the same time, not sacrificing speed.

Figure 6:
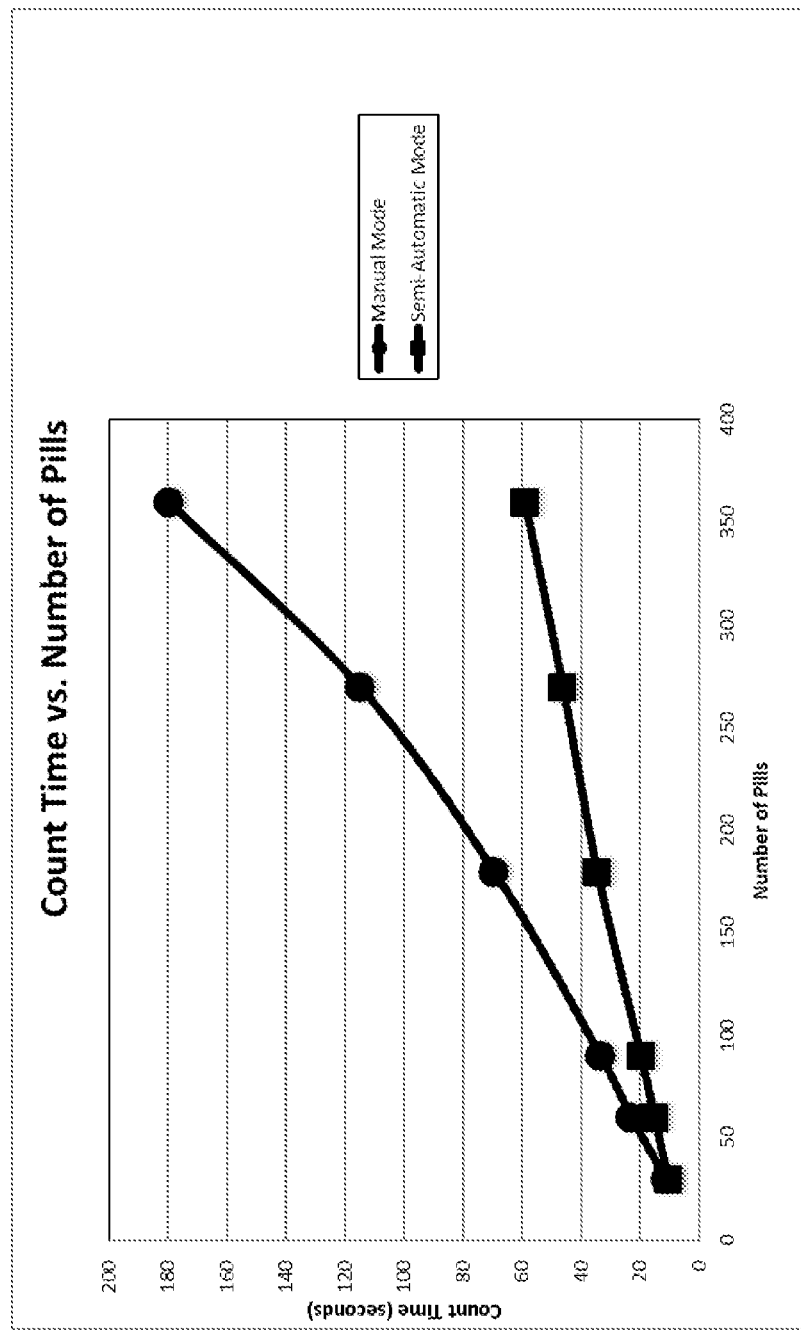
FIG. 6 is a graph showing the actual average time required to count pills for various prescription sizes with a well-trained user in both the manual-only and semi-automatic pill counting modes.

FIG. 6 is a graph showing the time (in seconds) to count the pills for various prescription counts ranging from 30 pills to 360 pills. This counting was done in the setting of a retail pharmacy by a trained user who was instructed to first count the pills as fast as practical using manual-only pill counting and then repeat the counting using a semi-automatic pill counting tray apparatus similar to the one shown in FIG. 1A following the counting sequence shown in the flow diagram of FIG. 5A. From the graph in FIG. 6, it is apparent that when counting a small order size, such as 30 pills, the time to fill a prescription is approximately equal for manual and semi-automatic counting. However, as the number of pills in a prescription count increases, the user requires a substantially longer time for manual-only counting than for semi-automatic counting. To convert the data shown in FIG. 6 to an actual time-savings per day that could be achieved at a typical pharmacy if semi-automatic counting were to fully replace manual-only counting, it is necessary to know how many prescriptions per day are filled and the number of pills in each of the various orders. This data, presented as exemplary, has been obtained for a typical pharmacy located in St. Louis that processes 255 prescriptions per day with the following breakdown in number of pills per prescription:

| NUMBER OF PRESCRIPTIONS PER DAY OF THIS SIZE | PRESCRIPTION SIZE (NUMBER OF PILLS) |
| --- | --- |
| 60 | 30 |
| 60 | 60 |
| 50 | 90 |
| 50 | 180 |
| 35 | 360 |
| TOTAL 255 | |

When the usage information in the above table is combined with the counting times in FIG. 6, one finds that approximately 225 minutes per day would be required to count the pills in these prescriptions manually while only 104 minutes would be required for semi-automatic counting using the apparatus and methods disclosed in this specification. The time difference of 121 minutes represents a time savings of approximately 2 hours per day per pharmacy if manual-only pill counting were replaced by semi-automatic counting. This represents a very significant time-savings that would be reflected in the efficiency and profitability of a pharmacy that converts from manual-only to semi-automatic counting.

While the above disclosure is focused on a semi-automatic pill counting tray apparatus and method of counting pharmaceutical pills, many of the teachings may be applicable to the counting of other objects where each object in a larger group has similar weight, such as various electronic components including integrated circuit chips, mechanical parts such as coins, precision washers and nuts, and medical parts such as hypodermic needles etc. It is therefore to be understood that the scope of this invention is broader than specifically described in the specification and following claims and that the apparatus and methods described herein relate to discrete object counting in general as well as specifically pharmaceutical pill counting.

The invention claimed is:

1. A pharmaceutical pill counting tray apparatus having a platform with a spout, trough, lid, lid latch, lid position sensor, weighing load sensor(s), microprocessor, and output display that is configured to be operated either in a manual or a semi-automatic counting mode such that when operated in the semi-automatic mode this apparatus is configured to count pills faster and more accurately than in manual mode because the user does not need to keep track of the number of pills loaded into the trough after an initial transfer and that the semi-automatic mode is based on determining the pill count using at least a single weighing load sensor located under the trough that provides an electrical output signal to said microprocessor that has been programmed to:
   (1) establish that the lid sensor has detected that the lid has rotated to a partially open position and is held fixed by the lid latch such that the lid substantially covers and extends over the trough to form a cocoon-like enclosure with an open passageway between the platform and trough of at least 10 mm in height,
   (2) determine the unit weight per pill based on initially weighing a group containing a known number of pills (e.g. 10) that are transferred through the said passageway and into the trough by sweeping them from the said platform, and then by dividing the total group weight by the known number of pills,
   (3) estimate the number of pills contained in each subsequent discrete group of one or more pills that is transferred through the passageway and into the trough, based on dividing the group's weight by the unit weight per pill established in (2), above, and
   (4) calculate the current total number of pills in the trough by summing each processed group with the previous total of pills in the trough, and show that current total on the said display, located on the top surface of the pill counting tray apparatus.

2. A pharmaceutical pill counting tray apparatus as in claim 1 such that the said microprocessor has also been programmed to qualify each group of pills transferred to the trough as allowable only if the group is estimated to contain no more than a predetermined limited number of pills, and if allowable, the total quantity of pills in the trough would then be updated on the display by adding the quantity of pills in the group to the previously determined total quantity of pills in the trough.

3. A pill counting tray apparatus as in claim 1 that includes a slot providing a horizontal separation between the said platform and the said trough large enough to pass dust and chips from pills but small enough not to pass any pills in which the width of the said slot is less than 2 mm and said slot serves as an entrance to a vertical channel through the entire tray and down to the surface on which the tray is positioned.

4. A pill counting tray apparatus as in claim 3 incorporating means to expel cleaning solutions, pill dust, and pill fragments comprised of a substantially unobstructed vertical channel starting with the said slot between the platform and the trough and extending to the bottom of the tray.

5. A pill counting tray apparatus as in claim 3 incorporating means to assure that pills do not deleteriously bridge the said slot between said trough and said platform comprised of 1) a protruding rim of height of at least 0.4 millimeters on the platform adjacent to the trough, and 2) a trough sloped at an angle of at least 30 degrees with respect to the platform at the intersection of the trough and platform.

6. A pill counting tray apparatus as in claim 4 incorporating means to prevent contamination of the weighing load sensor and to assure that pill dust or pill fragments are prohibited from entering the volume under the trough comprised of a lip shaped trough edge adjacent to the platform having a substantially vertical baffling effect on the trough side of the said vertical channel.

7. A pill counting tray apparatus as in claim 1 having a trough capacity in the range of 200 to 400 cubic centimeters.

8. A pill counting tray apparatus as in claim 1 having some or all structural parts made of plastic that are formed using a polycarbonate resin material or a blended plastic material having at least 75% polycarbonate resin that is safe for use when handling food.

9. A pill counting tray apparatus as in claim 1 that is powered by a rechargeable battery that is located within the pill counting tray apparatus structure that has an electrical connector port on its surface that can be used for making a temporary connection between the rechargeable battery and an external battery charger.

10. A pill counting tray apparatus as in claim 1 having an internal buzzer that is sounded for a limited period to alert the user to look at the said display to signal an error condition or to facilitate user programming.

11. A pill counting tray apparatus as in claim 1 having a touch sensitive switch that is sensitive to a light touch by either a finger or a plastic or metal spatula.

12. A pill counting tray apparatus as in claim 1 in which air disturbances including pulsatile pressure variations and turbulence can be sensed by the said weight load sensor operating in combination with the said microprocessor to average out the disturbing effects that can cause variability in the pill count due to the effects such air disturbances.

13. A pill counting tray apparatus as in claim 1 in which the pill count shown in the display is frozen at its current value when the said trough lid is rotated towards full closure and the motion is sensed by the contactless lid closure switch.

14. A pill counting tray apparatus as in claim 13 in which the display also shows the time duration from the start to the finish of the pill counting sequence.

15. A pill counting tray apparatus as in claim 1 in which any one of three nominal lid positions, including open, partially open, and fully closed, is determined by a fixed Hall effect sensor which detects the relative position of a permanent magnet attached to the said trough lid as it moves past the Hall effect sensor without making physical contact between the lid and the Hall effect sensor.

16. A pill counting tray apparatus as in claim 1 upon which a pair of food-safe plastic liners having various colors are attached to the pill counting apparatus with one liner secured in place over the platform and a second liner placed within the trough and also secured in place.

17. A pill counting tray apparatus as in claim 1 in which the center of gravity of the apparatus is under the platform and no more than 5 centimeters to the right side (towards the platform) of the axial centerline of the trough, and of a maximum total weight of the apparatus no more than one pound (454 grams).

18. A pill counting tray apparatus as in claim 1 in which all of the electronic components except the weighing load sensor are located in a single module.

19. A weight based method for counting a known and targeted number of pills for a pharmaceutical prescription practiced in concert with the said pill counting tray apparatus having a flat platform and an adjacent trough which are both initially empty, in which the operator performs the following steps:
   (1) pours an unknown quantity of pills from a storage container onto the said platform which the operator estimates to significantly exceed the targeted prescription count,
   (2) moves said lid that extends over said trough to a fixed and stable position established by said latch whereby the resulting structure of the said lid relative to the said counting tray readily facilitates manual transfers of pills between the said platform and said trough which are typically accomplished with a spatula, and whereby the said fixed position of the lid is detected by said electronic position sensor that triggers the electronics to prompt the operator to advance a specific and known initial quantity of pills from the said platform into said trough by showing an alphanumeric message on said output display that is associated with the said pill counting tray,
   (3) manually advances the said specific and known quantity of pills from the platform onto a weight measuring surface comprised of said trough surface directly above a weighing load sensor, whereby the electronics calculates an initial piece weight by dividing the measured weight of the pills in the trough by the said specific and known quantity and then shows the said specific and known quantity in numeric form on the said output display,
   (4) manually advances a first discrete group of one or more pills onto said trough surface such that the total count of pills in the trough is updated on the said output display after summing the first discrete group count with the previously displayed initial quantity of pills, whereby the first discrete group count is determined by calculating the net change in the total weight of pills in the trough occurring as a result of the introduction of the first discrete group, and dividing the said net weight change by the said initial piece weight, with the electronics then employing an algorithmic feature for conditionally updating the said initial piece weight to be equal to the current weight of all of the pills in the trough divided by the updated total count of pills shown on the said output display, and identifying the result as the current piece weight,
   (5) sees that the count shown on the said output display does not yet match the targeted prescription count, or otherwise skips directly to step (6) if it does, and manually advances an additional discrete group of one or more pills onto said trough surface such that the total count of pills in the trough is updated on the said output display after the group transfer and determined by summing the group count with the previously displayed total count of pills in the trough, whereby the group count is determined by dividing the respective net weight change of the pills in the trough by the current piece weight, and the electronics then updating the current piece weight conditionally according to the said algorithmic feature, and whereby the operator repeats this step (5) until the count shown on the said output display matches the targeted prescription count,
   (6) closes the said lid over the trough, and
   (7) lifts and maneuvers said pill counting tray to first pour the pills remaining on the platform back into the said storage container, and then dispenses the pills from the trough into a prescription container.

20. A weight based method for counting pills as in claim 19 in which the said pill counting tray requires a specific quantity of pills no greater than thirty (30) pills to comprise the first pills transferred into the trough, which are used to calculate the initial piece weight.

21. A weight based method for counting pills as in claim 19 in which the said pill counting tray requires that the total number of pills initially transferred from the platform to the trough is transferred in two discrete transfer groups, each group consisting of half the total.

22. A weight based method for counting pills as in claim 21 in which the said pill counting tray requires ten (10) pills to be initially transferred from the platform to the trough in two transfer steps consisting of five (5) pills in each step.

23. A weight based method for counting pills as in claim 21 or claim 22 in which said pill counting tray programmatically compares the weights of the first two transfer groups to confirm that they each contain the same number of pills before allowing the user to continue with the counting process, and alerting the user of a likely counting mistake if the weights of the first two transfer groups are not the same within a certain tolerance of error.

24. A weight based method for counting pills as in claim 19 in which the number of pills in each and every subsequent group transferred to the trough after the initial piece weight is calculated is limited to a maximum number of 60 pills by the pill counting algorithm in the microprocessor.

25. A pill counting tray apparatus as in claim 1 in which the counting algorithm in the microprocessor includes provisions for conservative pill counting by rounding off any positive fractional pill count to the nearest lower integer number of pills.

* * * * *